(12) United States Patent
Ogasawara et al.

(10) Patent No.: US 8,022,974 B2
(45) Date of Patent: Sep. 20, 2011

(54) EXPOSURE DEVICE, IMAGE FORMING APPARATUS AND COMPUTER READABLE MEDIUM STORING PROGRAM FOR EXPOSURE CONTROL

(75) Inventors: Fumihiko Ogasawara, Ebina (JP); Osamu Yasui, Ebina (JP); Michihiro Inoue, Ebina (JP); Ken Tsuchiya, Ebina (JP); Michio Taniwaki, Ebina (JP); Toshio Hisamura, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 68 days.

(21) Appl. No.: 12/568,256

(22) Filed: Sep. 28, 2009

(65) Prior Publication Data

US 2010/0208024 A1  Aug. 19, 2010

(30) Foreign Application Priority Data

Feb. 13, 2009 (JP) ................................ 2009-030589

(51) Int. Cl.
*B41J 2/435* (2006.01)
*B41J 2/47* (2006.01)
(52) U.S. Cl. ........................................ 347/237; 347/247
(58) Field of Classification Search .................. 347/116, 347/229, 234, 237, 238, 247–249
See application file for complete search history.

(56) References Cited

U.S. PATENT DOCUMENTS 6,570,671 B1 * 5/2003 Yamaguchi et al. ......... 358/1.16
2009/0135241 A1 * 5/2009 Miyake ......................... 347/249

FOREIGN PATENT DOCUMENTS

| JP | 3-290269 A | 12/1991 |
| JP | 2004-174722 A | 6/2004 |
| JP | 2005-059356 A | 3/2005 |
| JP | 2007-223166 A | 9/2007 |
| JP | 2008-093896 A | 4/2008 |

OTHER PUBLICATIONS

Notification of Reasons for Refusal issued Jan. 18, 2011, in counterpart Japanese Application No. 2009-030589.

* cited by examiner

*Primary Examiner* — Hai C Pham
(74) *Attorney, Agent, or Firm* — Sughrue Mion, PLLC

(57) ABSTRACT

An exposure device includes plural light emitting elements that light in turn for exposure, plural driving elements that drive each of the light emitting elements and a time changing member that changes one time period of a switching signal to switch light emitting elements driven by the driving elements among the plurality of light emitting elements in turn from a reference time, depending on an image forming speed, wherein the time changing member changes the one time period from the reference time for some of the light emitting elements during one main scan, and maintains the one time period as the reference time for the remaining light emitting elements.

6 Claims, 21 Drawing Sheets

PROCESS SPEED 100mm/sec

EXPOSURE DEVICE, IMAGE FORMING APPARATUS AND COMPUTER READABLE MEDIUM STORING PROGRAM FOR EXPOSURE CONTROL

CROSS-REFERENCE TO RELATED APPLICATIONS

This application is based on and claims priority under 35 U.S.C. §119 from Japanese Patent Application No. 2009-030589 filed on Feb. 13, 2009.

BACKGROUND

Technical Field

The present invention relates to an exposure device, an image forming apparatus and a computer readable medium storing a program for exposure control.

SUMMARY

According to an aspect of the invention, there is provided an exposure device including:
plural light emitting elements that light in turn for exposure;
plural driving elements that drive each of the light emitting elements; and
a time changing member that changes one time period of a switching signal to switch light emitting elements driven by the driving elements among the plurality of light emitting elements in turn from a reference time, depending on an image forming speed,
wherein the time changing member changes the one time period from the reference time for some of the light emitting elements during one main scan, and maintains the one time period as the reference time for the remaining light emitting elements.

BRIEF DESCRIPTION OF THE DRAWINGS

Exemplary embodiments of the present invention will be described in detail based on the following figures, wherein.

DETAILED DESCRIPTION

Hereinafter, an exemplary embodiment of the present invention will be described.

Figure 1:
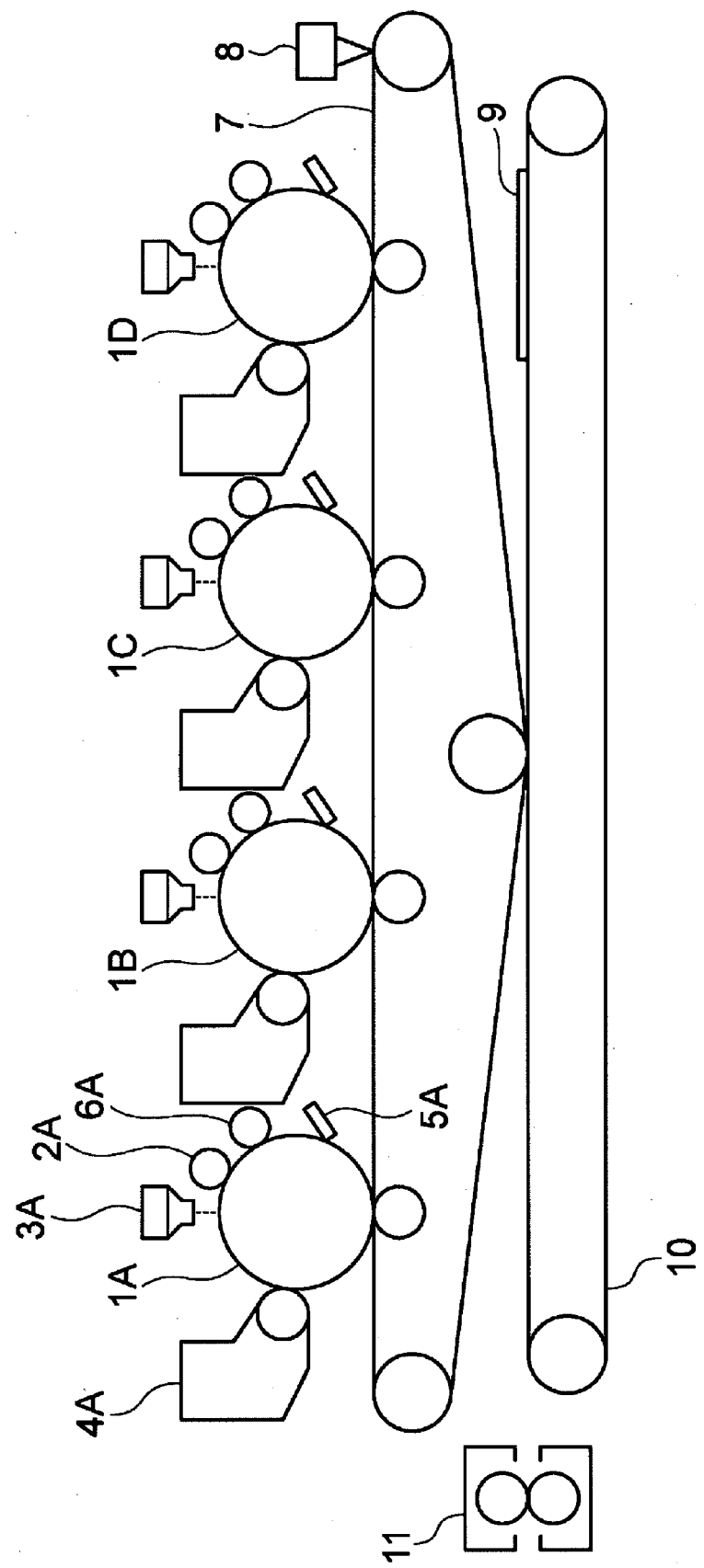
FIG. 1 is a view showing a general configuration of an image forming apparatus according to an exemplary embodiment of the present invention.

FIG. 1 is an explanatory view showing a general configuration of an image forming apparatus according to an exemplary embodiment of the present invention.

The image forming apparatus shown is an apparatus which is capable of forming a color image on a print medium using a tandem type electrophotographic method, where 4 drum-like photoconductors 1A, 1B, 1C and 1D are arranged around an intermediate transfer belt 7. Various kinds of devices used for forming images using an electrophotographic process are arranged around each of the photoconductors 1A, 1B, 1C and 1D. Configuration of these devices is common to the photoconductors 1A, 1B, 1C and 1D, and therefore, devices around the representative photoconductor 1A will be here described.

That is, a charger 2A, a printing head 3A, a developing unit 4A, a cleaner 5A and a de-electrifying unit 6A are arranged around the photoconductor 1A, and a toner image is formed on the photoconductor 1A with a yellow (Y) developer (in the following description, photoconductor 1 generally represents the photoconductors 1A, 1B, 1C and 1D. This is equally applied to the charger 2A, the printing head 3A, the developing unit 4A, the cleaner 5A and the de-electrifying unit 6A.). Similarly, magenta (M), cyan (C) and black (K) toner images are formed on the photoconductors 1B, 1C and 1D, respectively. Each of the toner images is transferred onto the intermediate transfer belt 7, while overlapping each other and carrying out registration based on a detection signal of register sensor 8, and the transferred toner images are again collectively transferred onto a recording sheet 9. The recording sheet 9 onto which the toner images are transferred is moved, via a sheet conveying belt 10, to a fixing unit 11 which fixes the toner images on the recording sheet 9 as a print medium, thus forming a color image.

Such a tandem type color image forming apparatus needs to miniaturize its YMCK color image forming devices in order to arrange them independently. Accordingly, a printing head is required to be miniaturized with the minimum of shared space around the circumference of a photoconductor drum, and an LED print head using an LED array including plural light emitting diodes (LEDs) as light emitting elements has been employed.

Hereinafter, an exposure device which exposes the photoconductor 1 using the printing head 3A will be described in detail.

Figure 2:
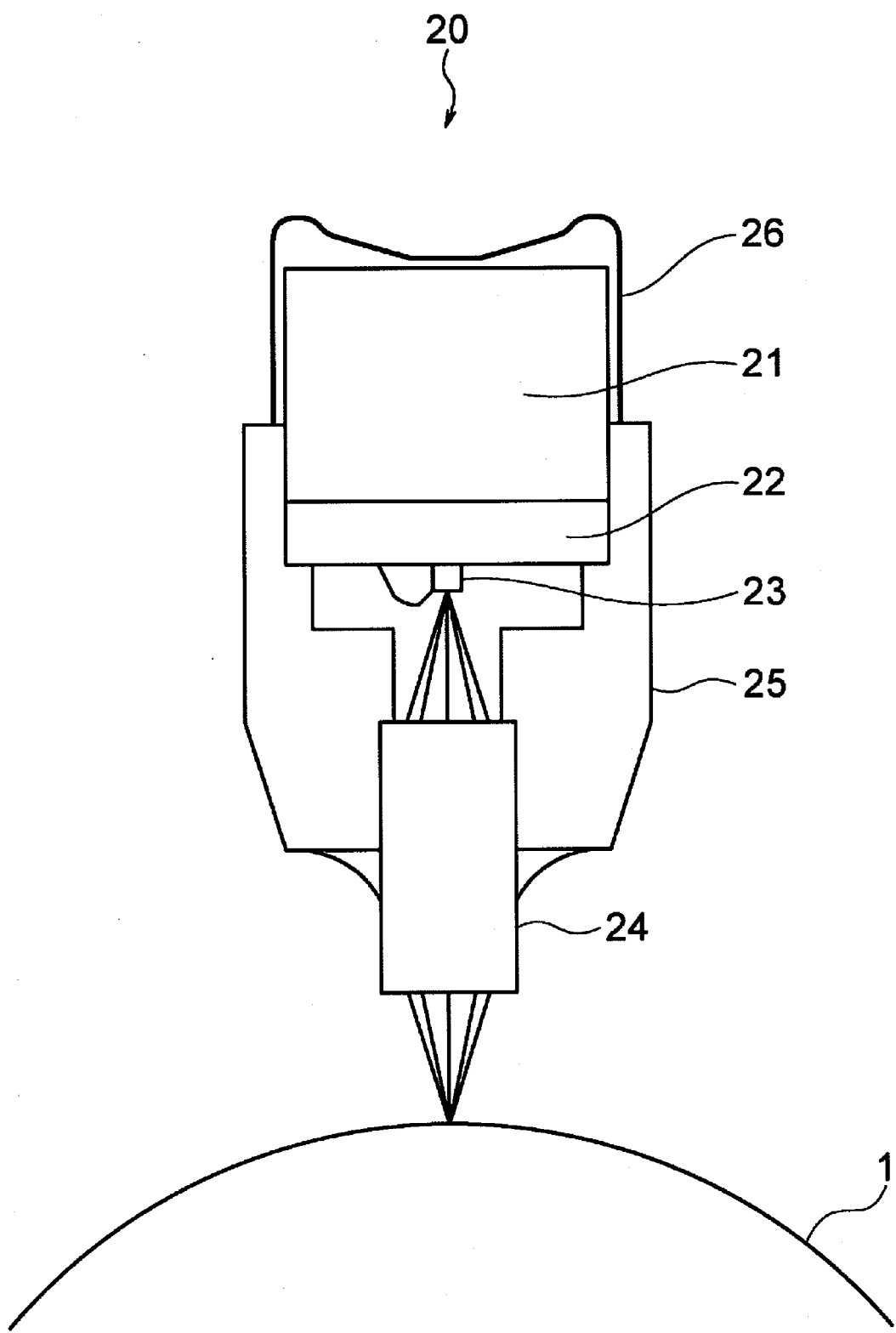
FIG. 2 is a sectional view for explaining a configuration of an LED print head of the image forming apparatus according to the exemplary embodiment of the present invention.

FIG. 2 is a sectional view for explaining a configuration of an LED print head.

An LED print head 20 is a light emitting device for photoconductor exposure provided in the printing head 3 and includes a housing 21 as a support, a print board 22 on which a light emitting element array driving device 50 to be described later is mounted, an LED array 23 irradiating exposure light, a SELFOC lens array 24 ("SELFOC" being a registered trade mark of Nippon Sheet Glass Company) which focuses light from the LED array 23 on a surface of the photoconductor drum 1, a SELFOC lens array holder 25 which supports the SELFOC lens array 24 and shields the LED array 23 from outside, and a leaf spring 26 which presses the housing 21 toward the SELFOC lens array 24.

The housing 21 is made of aluminum, a block such as SUS, or a metal plate and supports the print board 22 and the LED array 23. The SELFOC lens array holder 25 is configured to support the housing 21 and the SELFOC lens array 24 and match the light emitting point of the LED array 23 and the focus of the SELFOC lens array 24. In addition, the SELFOC lens array holder 25 is arranged to seal the LED array 23. Accordingly, external dust can not adhere to the LED array 23. The leaf spring 26 urges a force toward the SELFOC lens array 24 via the housing 21 to maintain the positional relationship between the LED array 23 and the SELFOC lens array 24.

The above-configured LED print head 20 is movable in an optical axis of the SELFOC lens array 24 by means of an adjusting screw (not shown) and is adjusted such that an image forming position (focus) of the SELFOC lens array 24 is positioned on the surface of the photoconductor drum 1.

In the LED array 23, plural LED chips 40 are arranged on a chip substrate in a column with high precision in parallel to an axial direction of the photoconductor drum 1, as will be described later. Similarly, in the SELFOC lens array 24, a self-focusing fiber is arranged in a column with high precision in parallel to the axial direction of the photoconductor drum 1. Light from the LED array 23 is focused on the surface of the photoconductor drum 1 to form an electrostatic latent image.

Figure 3:
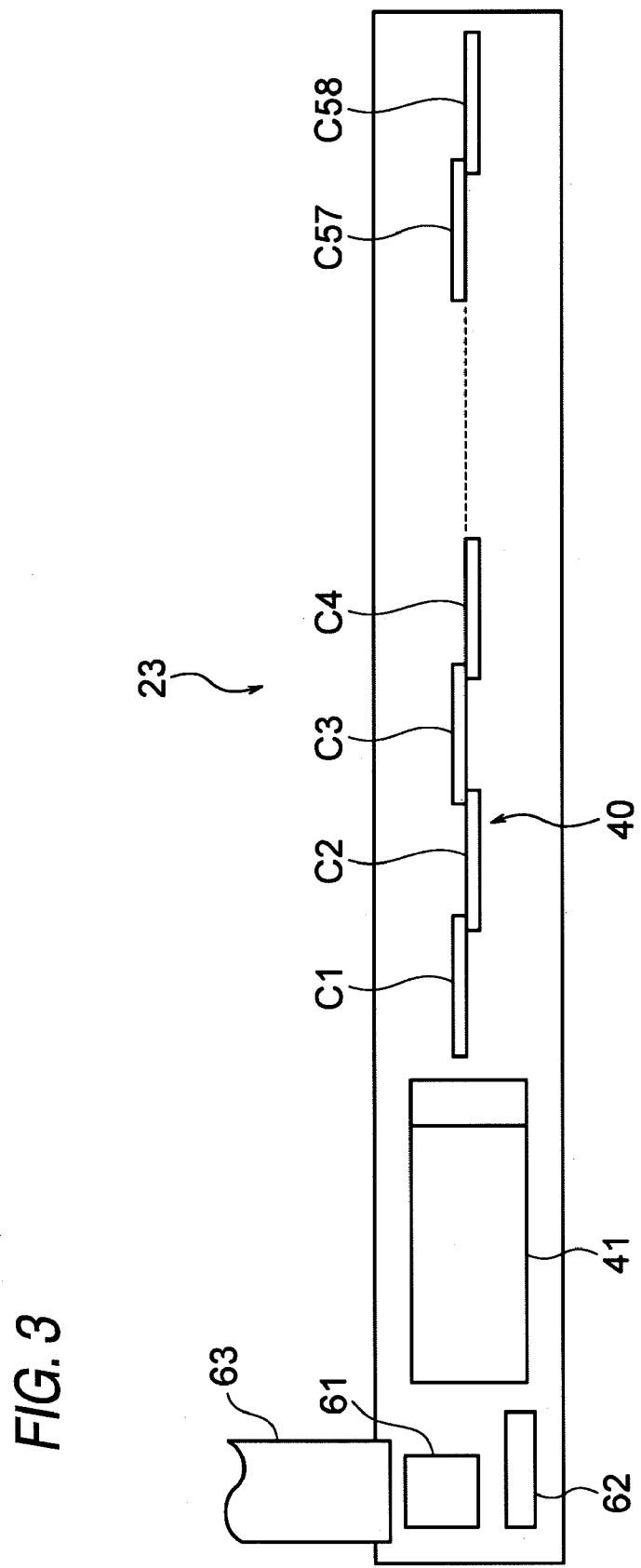
FIG. 3 is a plan view of an LED array 23 including plural LED chips arranged in the image forming apparatus according to the exemplary embodiment of the present invention.

FIG. 3 is a plan view of the LED array 23 including the plural LED chips 40.

In the LED array 23, 58 LED chips 40 (C1 to C58) are arranged in a column with high precision in parallel to the axial direction of the photoconductor drum 1. The LED chips 40 are arranged in zigzags. In the LED print head 20, 128 LEDs are mounted on each LED chip 40. A driving device 41 for driving the LED chips 40 is provided in the LED array 23. In addition, in the LED array 23 are provided a power circuit 61 for stabilizing an output voltage, an EEPROM 62 for storing light amount correction value data and so on of LEDs constituting the LED chips 40, and a harness 63 for exchanging signals with a body of the image forming apparatus.

A self-scan type LED is applied to the LED print head 20. The self-scan type LED corresponds to a switch for selectively switching on/off a light emitting point and applies a thyristor structure. The application of the thyristor structure allows the arrangement of switch parts on the same chip as the light emitting point as well as the association of data lines and the simplification of wiring from the selective emission of the on/off timing of the switch by the two signal lines.

Figure 4:
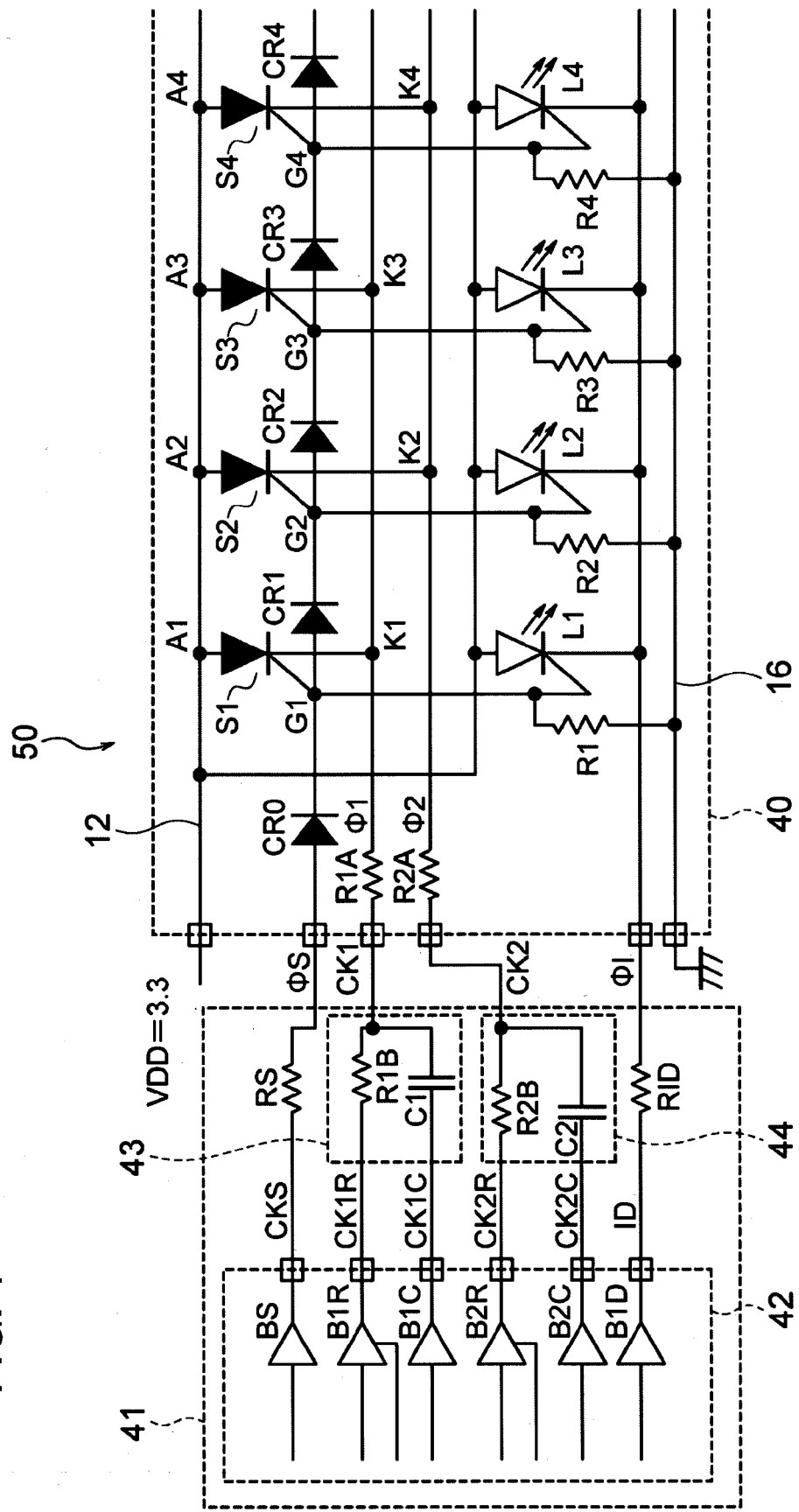
FIG. 4 is a circuit diagram for explaining a light emitting element array driving device in an LED print head applying self-scan type LEDs of the image forming apparatus according to the exemplary embodiment of the present invention.

FIG. 4 is a circuit diagram for explaining a light emitting element array driving device 50 in the LED print head 20 applying the self-scan type LEDs.

In FIG. 4, the light emitting element array driving device 50 includes the LED chip 40 and the driving device 41 for driving the LED chips 40. The LED chip 40 is configured by n thyristors S1, S2, . . . , Sn as LED driving elements (in the figure, the thyristors are shown as an appropriate equivalent circuit), n light emitting diodes (LEDs) L1, L2, . . . , Ln, n+1 diodes CR0, CR1, CR2, . . . , CRn, etc. The driving device 41 is configured by resistors RS, R1B, R2B and RID, capacitors C1 and C2, a signal generating circuit 42, etc. FIG. 4 shows only portions of the thyristors, light emitting diodes, and diodes provided in the LED chip 40.

Hereinafter, a circuit configuration of the LED chip 40 and the driving device 41 will be described. First, anode terminals A1 to An of thyristors S1 to Sn are connected to a power line 12. A power voltage VDD (VDD=3.3 V) is supplied to the power line 12. Cathode terminals K1, K3, . . . of odd-numbered thyristors S1, S3, . . . are connected to the signal generating circuit 42 via a resistor R1A, and a level shift circuit 43 in which a signal line connected with the resistor R1B and a signal line connected with the capacitor C1 are branched in parallel is connected between the resistor R1A and the signal generating circuit 42. Cathode terminals K2, K4, . . . of even-numbered thyristors are connected to the signal generating circuit 42 via a resistor R2A, and a level shift circuit 44 in which a signal line connected with the resistor R2B and a signal line connected with the capacitor C2 are branched in parallel is connected between the resistor R2A and the signal generating circuit 42.

In the meantime, gate terminals G1 to Gn of the thyristors S1 to Sn are connected to the power line 16 via resistors R1 to Rn provided corresponding to the thyristors, respectively. The power line 16 is grounded (GND).

In addition, the gate terminals G1 to Gn of the thyristors S1 to Sn are connected to gate terminals of the light emitting diodes L1 to Ln provided corresponding to the thyristors S1 to Sn, respectively.

In addition, anode terminals of the diodes CR1 to CRn are connected to the gate terminals G1 to Gn of the thyristors S1 to Sn, respectively. Cathode terminals of the diodes CR1 to CRn are connected to gate terminals of the next stage. That is, the diodes CR1 to CRn are connected in series.

An anode terminal of the diode CR1 is connected to a cathode terminal of the diode CR0 and an anode terminal of the diode CR0 is connected to the signal generating circuit 42 via the resistor RS. In addition, cathode terminals of the light emitting diodes L1 to Ln are connected to the signal generating circuit 42 via the resistor RID. The light emitting diodes L1 to Ln are made of, for example, AlGaAsP or GaAsP and their band gap is about 1.5 V.

Figure 5:
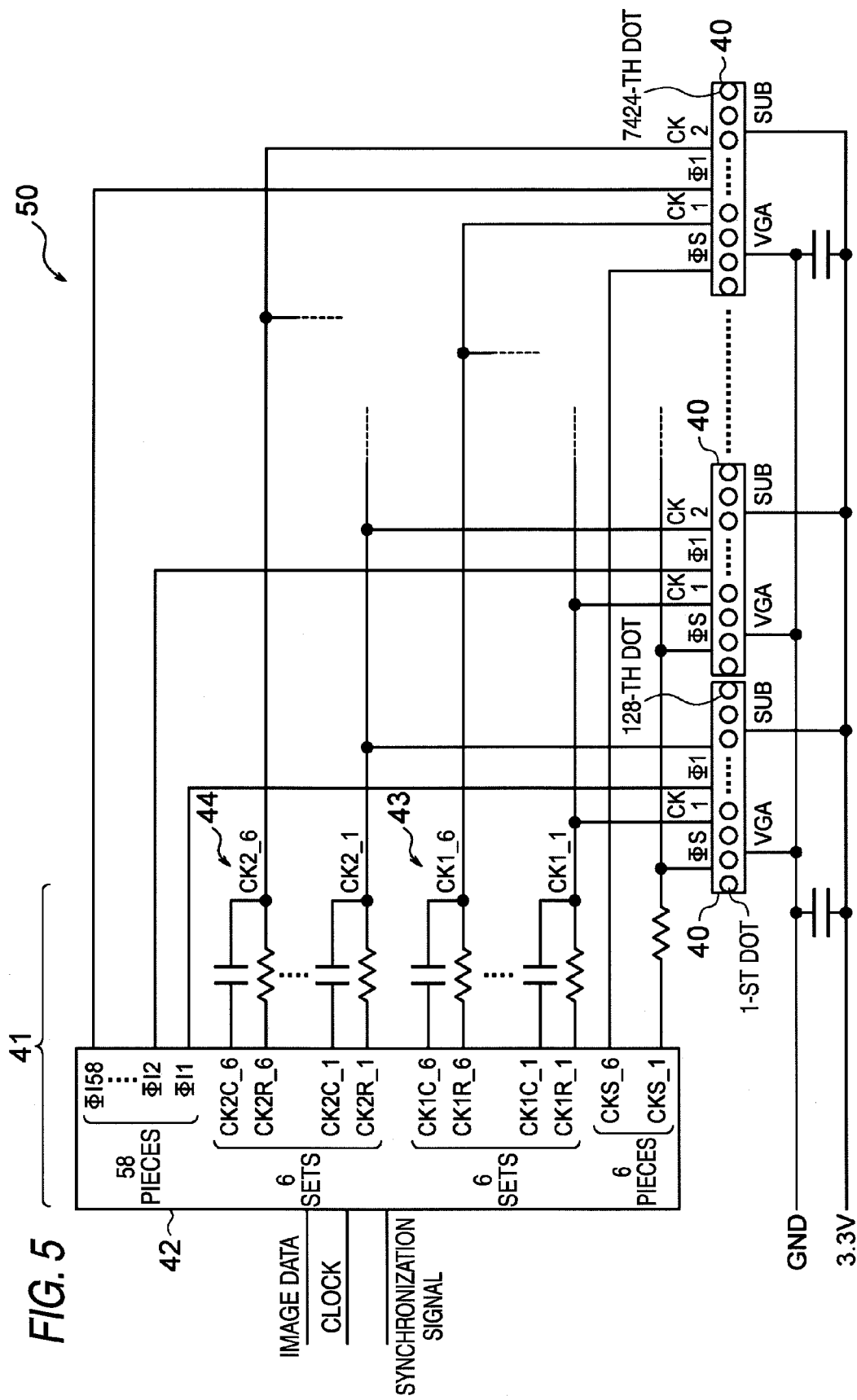
FIG. 5 is a circuit diagram for explaining a light emitting element array driving device of the image forming apparatus according to the exemplary embodiment of the present invention.

FIG. 5 is a circuit diagram for explaining the light emitting element array driving device 50.

FIG. 5 shows a configuration where an image is recorded on an A3-sized recording sheet with 600 dpi (dot per inch) and a configuration where LED elements of 7424 dots are driven. That is, 58 LED chips 40, each being configured by 128 dots, are mounted on the LED print head 20 of this exemplary embodiment.

In FIG. 5, 58 IDs as LED lighting signals are arranged, with one per one LED chip 40. Transmission signals CK1, CK2 and CKS each drive 9 or 10 chips, 6 sets of transmission signals are arranged, and the level shift circuits 43 and 44 (see FIG. 4) are arranged for each set. With this configuration, the driving capability of each of the transmission signals CK1, CK2 and CKS is reduced, and all the LED chips 40 are stably driven at a low voltage.

Figure 6:
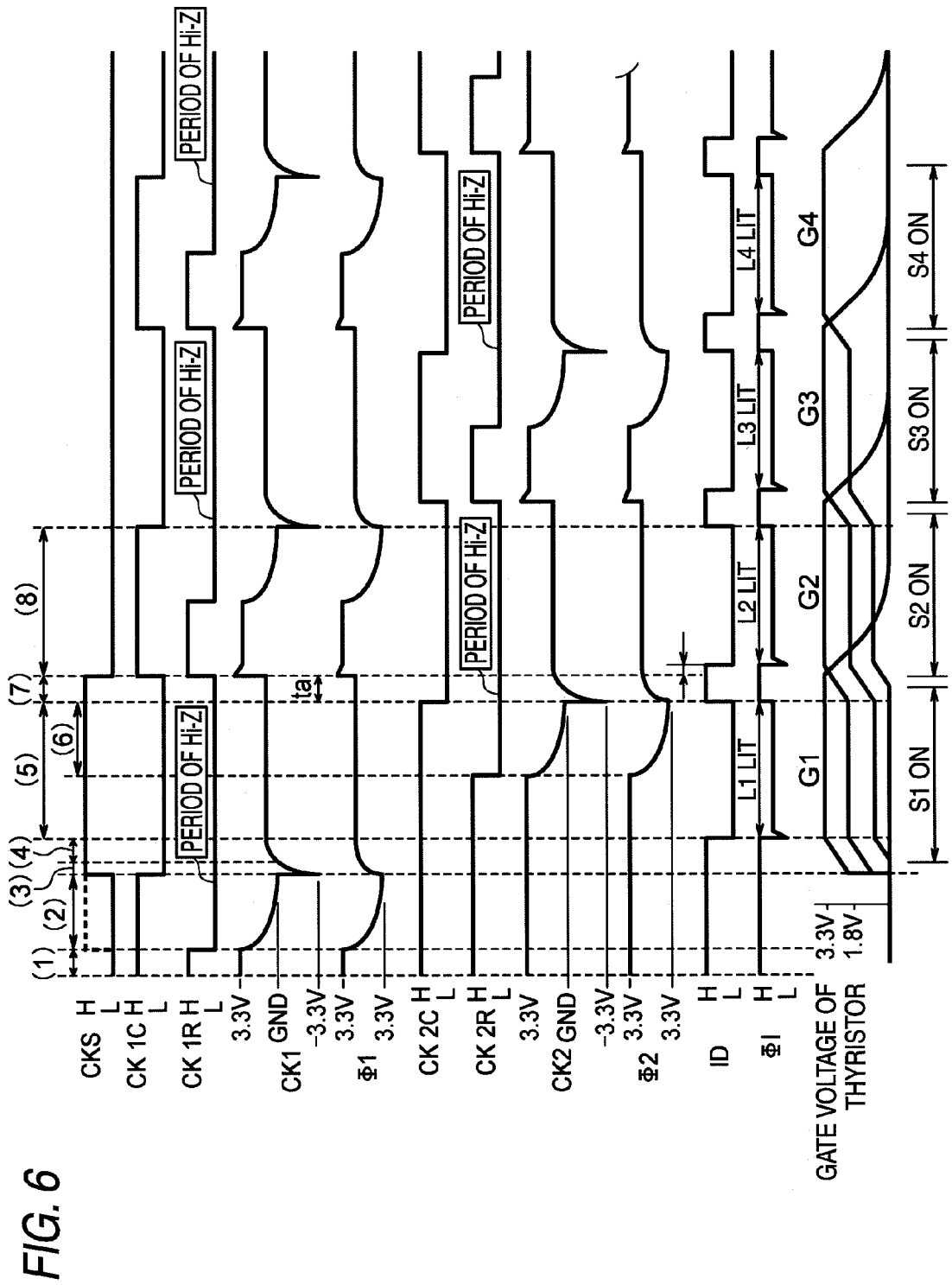
FIG. 6 is a timing chart for the operation of each part of a light emitting element array driving device of the image forming apparatus according to the exemplary embodiment of the present invention.

Next, an operation of the light emitting element array driving device 50 shown in FIG. 4 will be described with reference to a timing chart shown in FIG. 6. In FIG. 6, using the reference numerals denoting the signal lines in FIG. 4 makes clear which signal in the circuit of FIG. 4 corresponds to each signal in FIG. 6. Hereinafter, a case where the number of thyristors is 4 (n=4) will be illustrated.

(1) First, at an initial state, all the thyristors S1, S2, S3 and S4 are turned off since no current flows therethrough (FIG. 6(1)).

Figure 7:
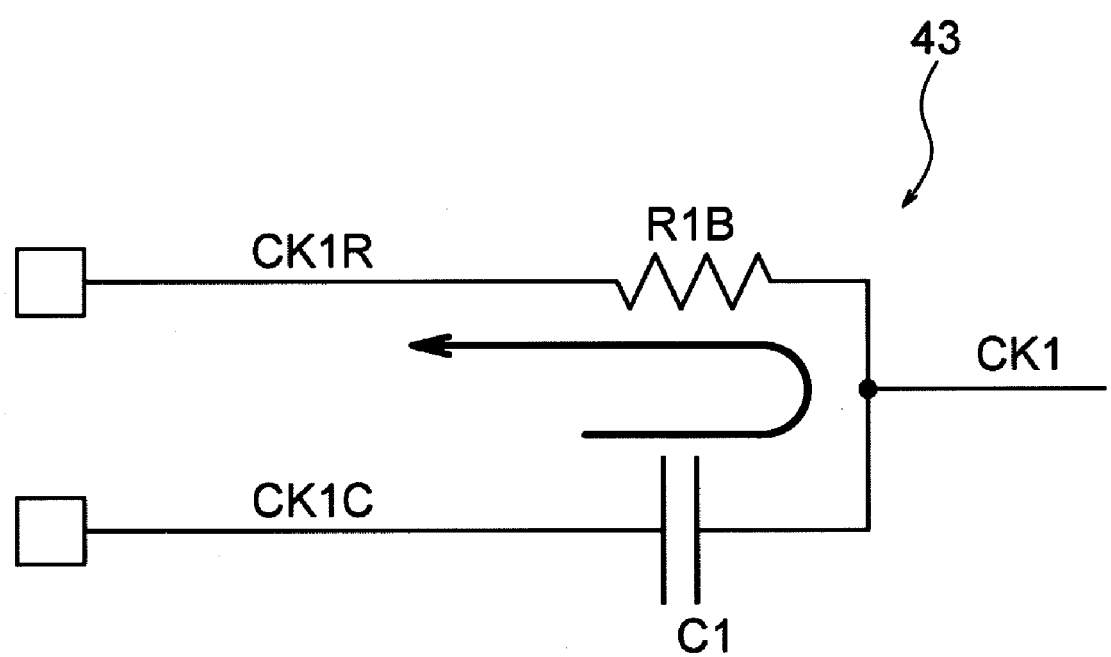
FIG. 7 is a view for explaining a flow of current of a level shift circuit when a transmission signal CK1R is set to an L level from an initial state in the image forming apparatus according to the exemplary embodiment of the present invention.

(2) From the initial state, when the transmission signal CK1R goes to an L level (FIG. 6(2)), current flows through the level shift circuit 43 in an arrow direction as shown in FIG. 7, and then the potential of the transmission signal CK1 becomes GND. In this example, since the voltage of the transmission signal CK1C is 3.3 V, the voltage across the capacitor C1 becomes 3.3 V (VDD). In this case, as indicated by a timing dotted line of FIG. 6(2), transmission signal CKS may be assumed as an H level.

(3) At the same time, when the transmission signal CKS goes to the H level and the transmission signal CK1C goes to an L level (FIG. 6(3)), the voltage of the transmission signal CK1 becomes about −3.3 V since charges are accumulated in the capacitor C1. In addition, the voltage of the gate G1 becomes about 1.8 V (ΦS voltage-Vf). Here, the ΦS voltage is about 3.3 V and Vf, meaning a diode forward voltage of AlGaAs, is about 1.5 V. In addition, Φ1 voltage=G1 voltage-Vf=0.3V. Accordingly, a potential difference of about 3.7 V occurs between the signal line Φ1 and the transmission signal CK1.

Figure 8:
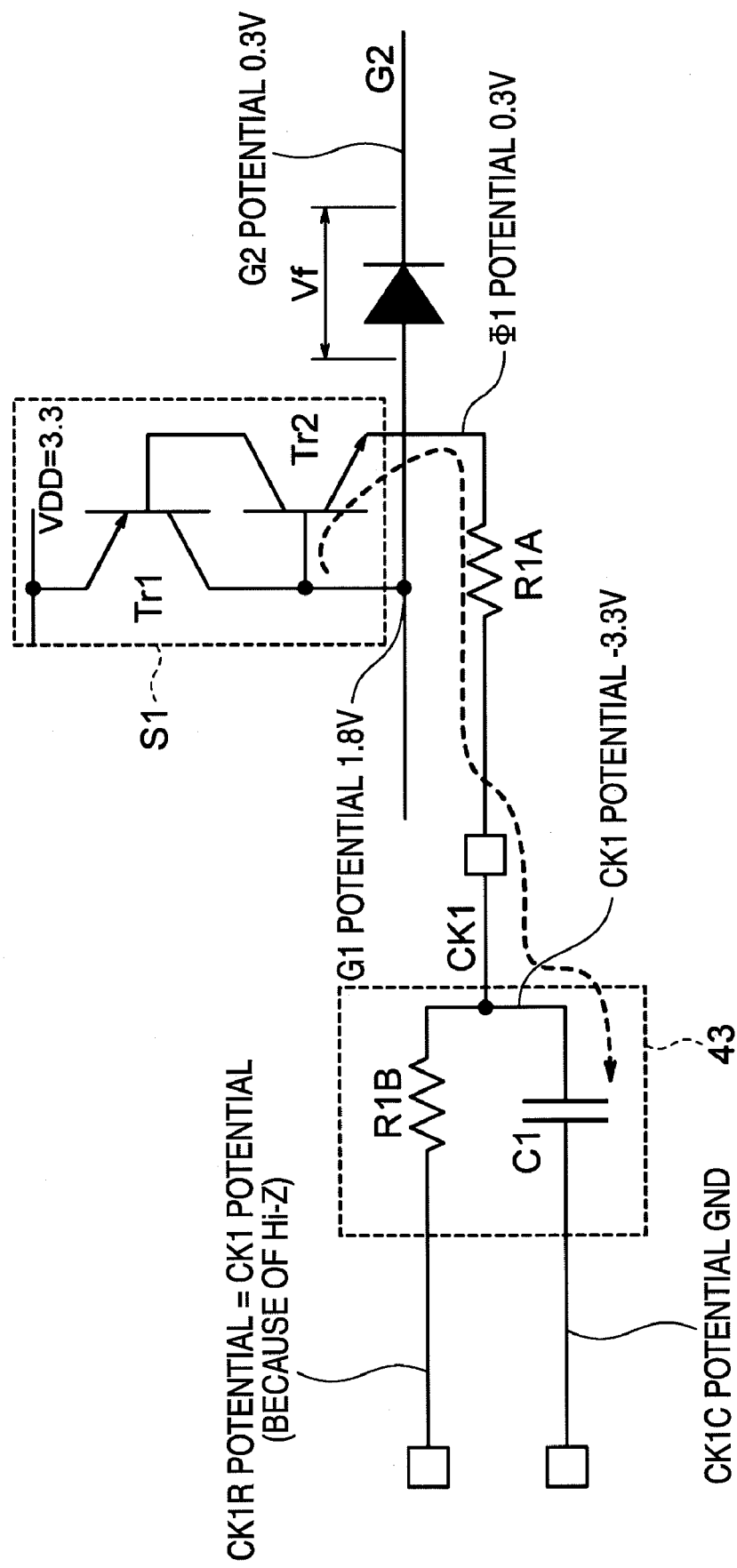
FIG. 8 is a view for explaining a flow of current immediately after a transmission signal CKS is set to an H level and a transmission signal CK1C is set to an L level in the image forming apparatus according to the exemplary embodiment of the present invention.

In this state, as shown in FIG. 8, the gate current of the thyristor S1 begins to flow along a route of gate G1→signal line Φ1→transmission signal CK1. At that time, the current is prevented from flowing backward by putting the tri-stator buffer B1R of the signal generating circuit 42 into high impedance (Hi-Z).

Thereafter, according to an order that Tr2 is turned on by the gate current of thyristor S1, and accordingly a base current of Tr1 (collector current of Tr2) flows, and Tr1 is turned on, the thyristor S1 begins to be turned on and the gate current slowly increases. At the same time, current flows into the capacitor C1 of the level shift circuit 43 and accordingly the potential of the transmission signal CK1 slowly increases.

(4) After a predetermined period of time has lapsed (a period of time during which the potential of the transmission signal CK1 becomes near GND), the tri-stator buffer B1R of the signal generating circuit 42 goes to an L level (FIG. 6(4)). Thus, as the potential of the gate G1 increases, the potential of the signal line Φ1 and the potential of the transmission signal CK1 increase and accordingly current begins to flow through the resistor R1B of the level shift circuit 43. On the other hand, as the potential of the transmission signal CK1 increases, current flowing into the capacitor C1 of the level shift circuit 43 slowly decreases.

Figure 9:
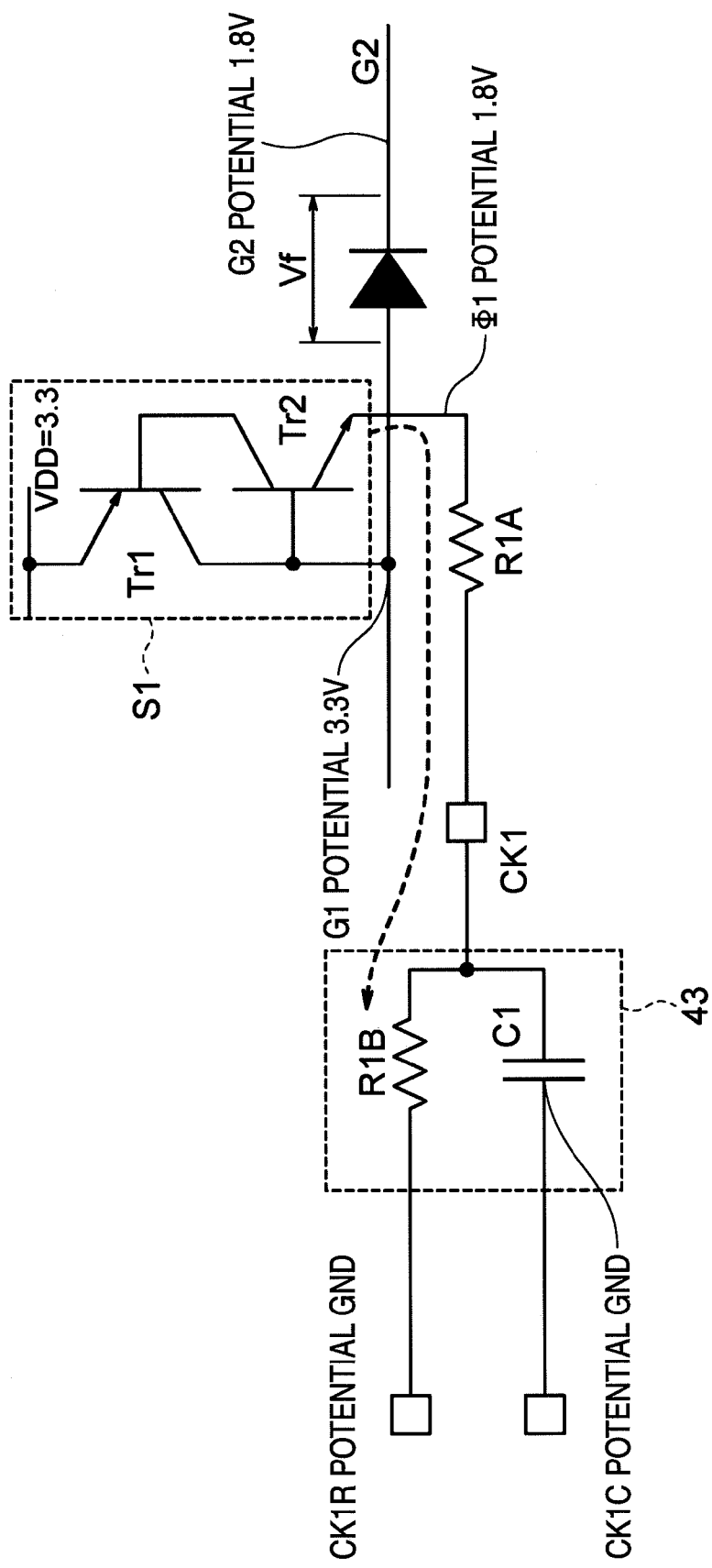
FIG. 9 is a view for explaining the potential of each part in a normal state where a thyristor S1 is completely turned on in the image forming apparatus according to the exemplary embodiment of the present invention.

When the thyristor S1 is completely turned on and enters a normal state, the potential of each signal line is as shown in FIG. 9. That is, the current for maintaining the on state of the thyristor S1 flows through the resistor R1B of the level shift circuit 43, but does not flow through the capacitor C1. The potential of the transmission signal CK1 is 1.8−1.8×R1B/(R1A+R1B).

(5) In the state where the thyristor S1 is completely turned on, a lighting signal ID goes to an L level (FIG. 6(5)). At this time, since the potential of gate G1>potential of gate G2 (potential of gate G1-potential of gate G2=1.8 V), the LED L1 of the thyristor structure is quickly turned on and lit. With the LED L1 turned on, since the potential of the signal line Φ1 increases and the potential of the signal line Φ1=potential of gate G2=1.8 V, LEDs after the LED L2 can not be turned on. That is, among all LEDs L1, L2, L3, L4, . . . , only the LED having the highest gate voltage is turned on (lit).

Figure 10:
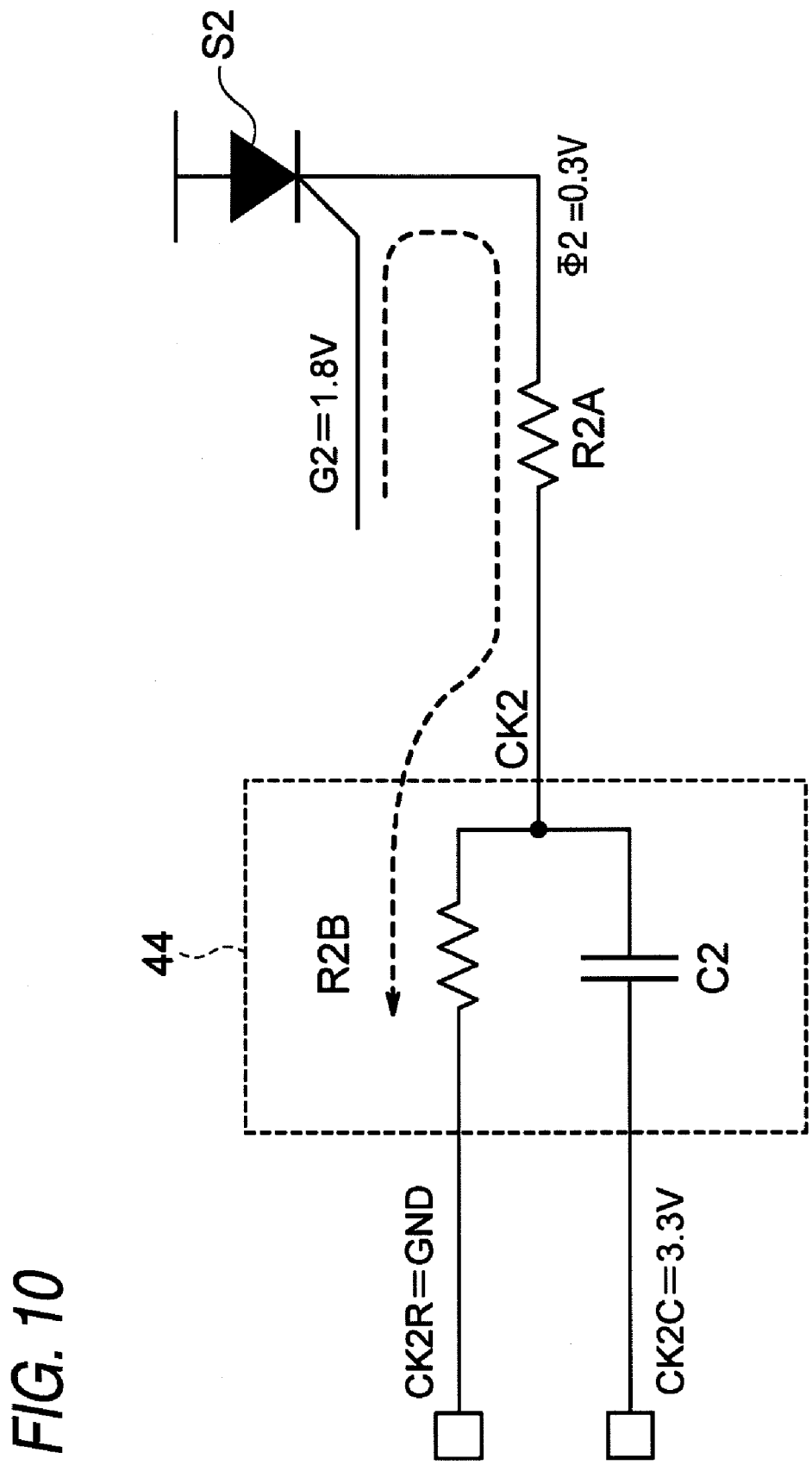
FIG. 10 is a view for explaining a state where a gate current flows through a thyristor S2 in the image forming apparatus according to the exemplary embodiment of the present invention.

(6) Next, when the transmission signal CK2R goes to an L level (FIG. 6(6)), similar to FIG. 6(2), current flows and a voltage is generated across the capacitor C2 of the level shift circuit 44. Since the voltage of the gate G2 is 1.8 V in the normal state immediately before the termination of FIG. 6(6), there is no effect on operation although the voltage value at each point is somewhat different from FIG. 6(2). This is because, since the potential of signal line Φ2=potential of gate G2−Vf=1.8 V−1.5 V=0.3 V in the normal state immediately before termination of FIG. 6(6), although gate current flows through the thyristor S2 in a dotted line direction as shown in FIG. 10, the thyristor S2 is not turned on since the amount of gate current is small. In this case, the potential of the transmission signal CK2 is 0.3−0.3×R2B/(R2A+R2B) ≅0.15.

(7) In this state, when the transmission signal CK2C goes to an L level (FIG. 6(7)), the thyristor switch S2 is turned on.

(8) Then, when the transmission signals CK1C and CK1R go to an H level simultaneously (FIG. 6(8)), the thyristor switch S1 is turned off and the potential of the gate G1 slowly decreases by discharge through the resistor R1. At that time, the gate G2 of the thyristor switch S2 has a voltage of 3.3 V and is completely turned on. Accordingly, the LED L2 can be lit/non-lit by changing a lighting signal ID terminal corresponding to image data to L level/H level. In this case, since the potential of the gate G1 has already been lower than the potential of the gate G2, the LED L1 can not be turned on.

In this manner, with the light emitting element array driving device 50, since the on state of the thyristor switches of the thyristors S1, S2, . . . , Sn can be shifted by alternately driving the transmission signal CK1 and CK2, the lighting/non-lighting of the LEDs L1, L2, . . . , Ln can be selectively controlled by time division.

Figure 11:
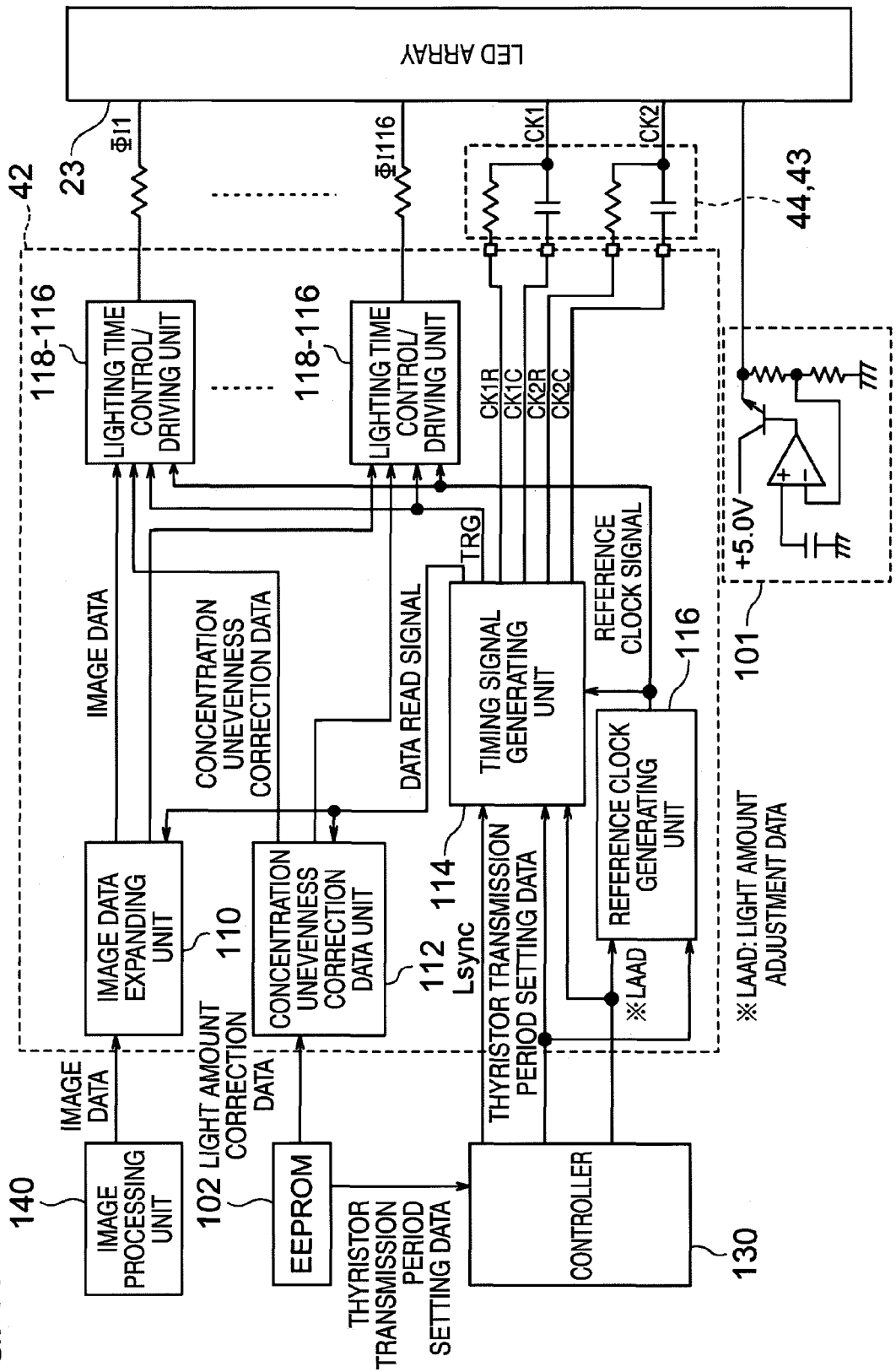
FIG. 11 is a circuit diagram of a signal generating circuit in the image forming apparatus according to the exemplary embodiment of the present invention.

FIG. 11 is a circuit diagram of the signal generating circuit 42.

The signal generating circuit 42 includes, its main parts, an image data expanding unit 110, a concentration unevenness correction data unit 112, a timing signal generating unit 114, a reference clock generating unit 116, and a lighting time control/driving unit 118 (118-1 to 118-58).

Image data that have been subjected to an image process are transmitted in series from an image processing unit 140, which performs a predetermined image process for the image data for forming an image in an image forming apparatus, to the image data expanding unit 110. The image data expanding unit 110 performs a process such as dividing the transmitted image data into image data to be transmitted to 58 LED chips 40, such as, for example, 1 to 128 dots, 129 to 256 dots, . . . , 7297 to 7424. Then, the divided image data are output to the lighting time control/driving unit 118-1 to 118-58.

The concentration unevenness correction data unit 112 stores concentration unevenness correction data used to correct variations of the amount of light emitted by the LEDs in the LED array 23. The concentration unevenness correction data are output to the lighting time control/driving unit 118-1 to 118-58 in synchronization with a data read signal from the timing signal generating unit 114. The concentration unevenness correction data are data set for the LEDs and are data of, for example, 8 bits (0 to 255).

An EEPROM 102 stores LED light amount correction data calculated in advance when the LED array 23 is manufactured, and if necessary, concentration unevenness correction data. When the image forming apparatus is powered on, the LED light amount correction data and so on are read from the EEPROM 102 to the concentration unevenness correction data unit 112. The concentration unevenness correction data unit 112 generates concentration unevenness correction data based on the acquired LED light amount correction data and, if necessary, light amount correction data and other data, and outputs the generated data to the lighting time control/driving unit 118-1 to 118-58.

The reference clock generating unit 116 generates a reference clock required in the signal generating circuit 42 and is connected to a controller 130 of a body, the timing signal generating unit 114 and the lighting time control/driving unit 118-1 to 118-58.

The timing signal generating unit 114 is connected to the controller 130 and the reference clock generating unit 116 and generates the transmission signals CK1R and CK1C and the transmission signals CK2R and CK2C in synchronization with a horizontal synchronization signal Lsync from the controller 130 based on the reference clock signal from the reference clock generating unit 116. The signal Lsync is a timing signal providing the start timing for one main scan. The transmission signals CK1R and CK1C and the transmission signals CK2R and CK2C are changed to the transmission signal CK1 and the transmission signal CK2 through the level shift circuit 104, which are transmitted to the LED array 23. Although it is shown in FIG. 11 that the timing signal generating unit 114 outputs one set of transmission signals CK1R and CK1C and transmission signals CK2R and CK2C, plural sets (for example, 6 sets) of transmission signals CK1R and CK1C and transmission signals CK2R and CK2C is actually output.

The timing signal generating unit 114 is also connected to the concentration unevenness correction data unit 112 and the image data expanding unit 110 and outputs a data read signal for reading the image data corresponding to each pixel from the image data expanding unit 110 and a data read signal for reading the concentration unevenness correction data corresponding to each pixel (each LED) from the concentration unevenness correction data 112 in synchronization with the signal Lsync from the controller 130 based on the reference clock signal from the reference clock generating unit 116.

The timing signal generating unit 114 is also connected to the lighting time control/driving unit 118-1 to 118-58 and outputs a trigger signal TRG for the start of the lighting of the LED array 23 based on the reference clock signal from the reference clock generating unit 116.

The lighting time control/driving unit 118-1 to 118-116 corrects the lighting time of each pixel (each LED) based on the concentration unevenness correction data and generates lighting signals ΦI (ΦI1 to ΦI58) for lighting each pixel (each LED) of the LED array 23.

In addition, a 3-terminal regulator 101 generates a supply voltage for the LED array 23.

Figure 12:
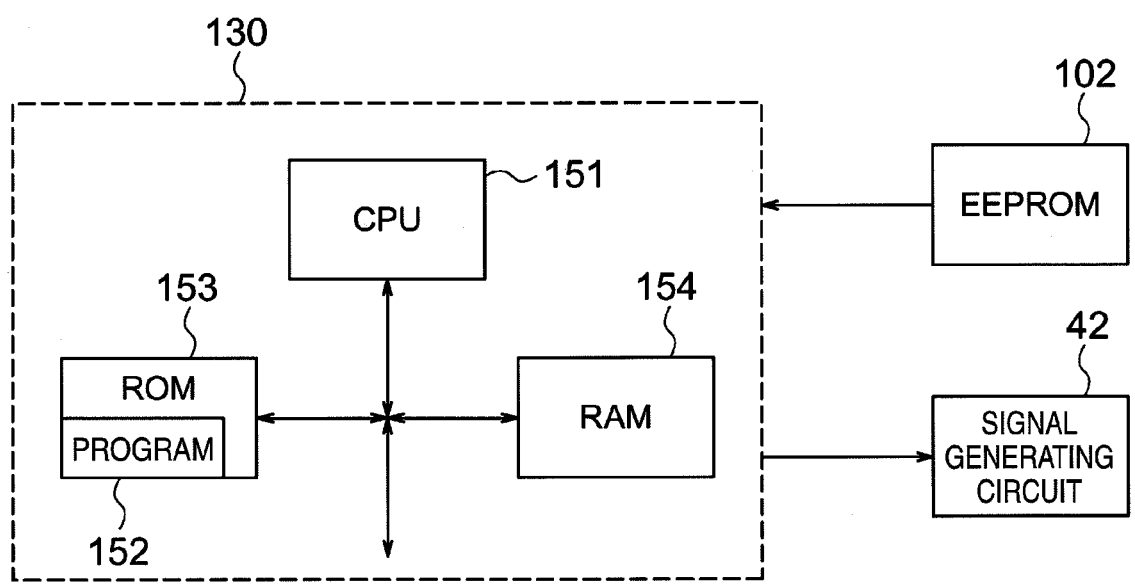
FIG. 12 is a block diagram showing a configuration of a controller in the image forming apparatus according to the exemplary embodiment of the present invention.

FIG. 12 is a block diagram showing a configuration of the controller 130.

The controller 130 includes a CPU 151 which intensely controls the driving signal generating unit 42 and so on, and to which a ROM 153 which stores various control programs 152 and fixed data, and a RAM 154 as a work area of the CPU 151 are connected. The control programs 152 may be stored in advance when the image forming apparatus is manufactured, may be read from a storing medium storing the control programs 152, or alternatively, may be downloaded via a communication means such as the Internet and set in a storing device such as the EEPROM 102.

Figure 13:
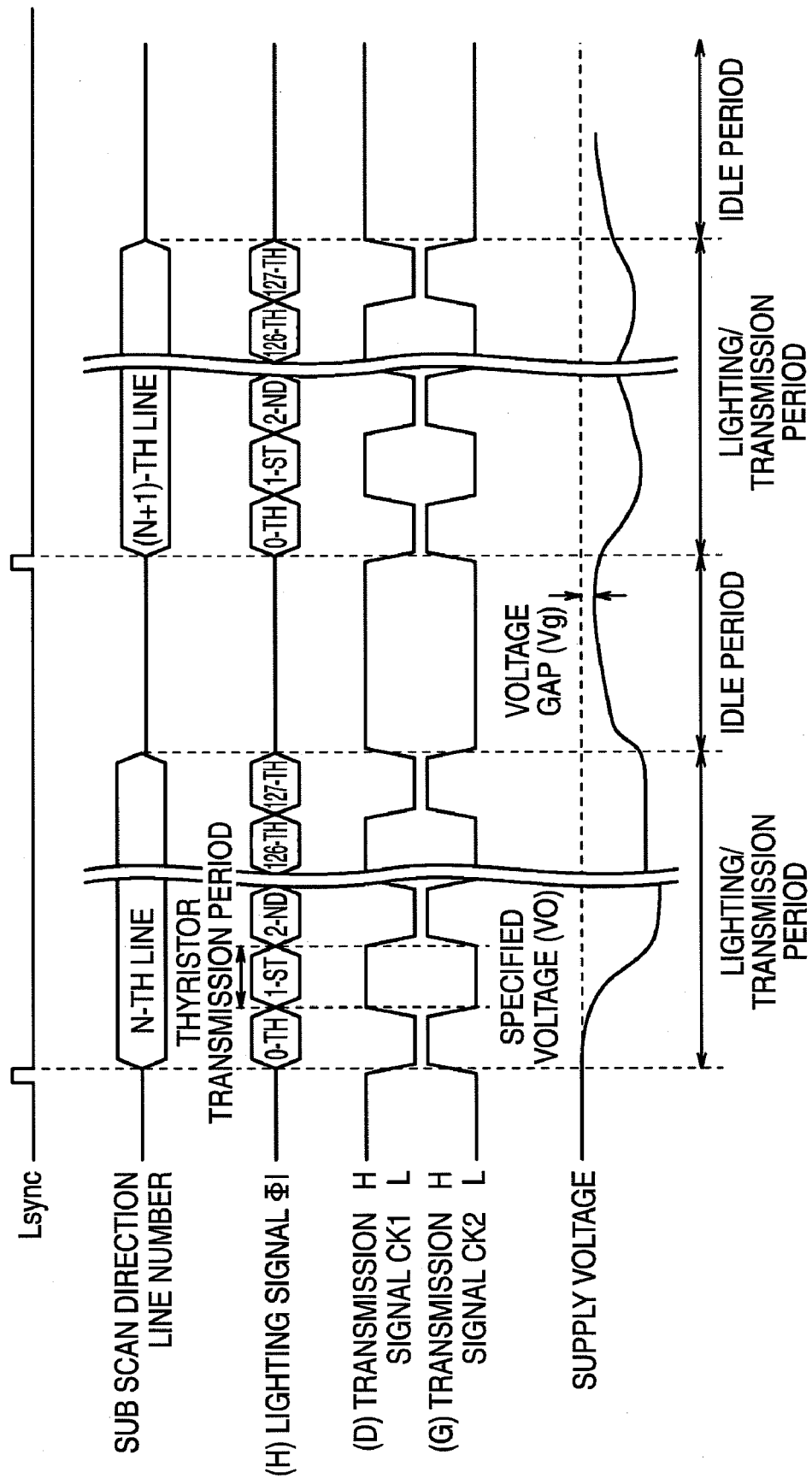
FIG. 13 is a timing chart for each signal in the related art of the present invention.
Figure 14:
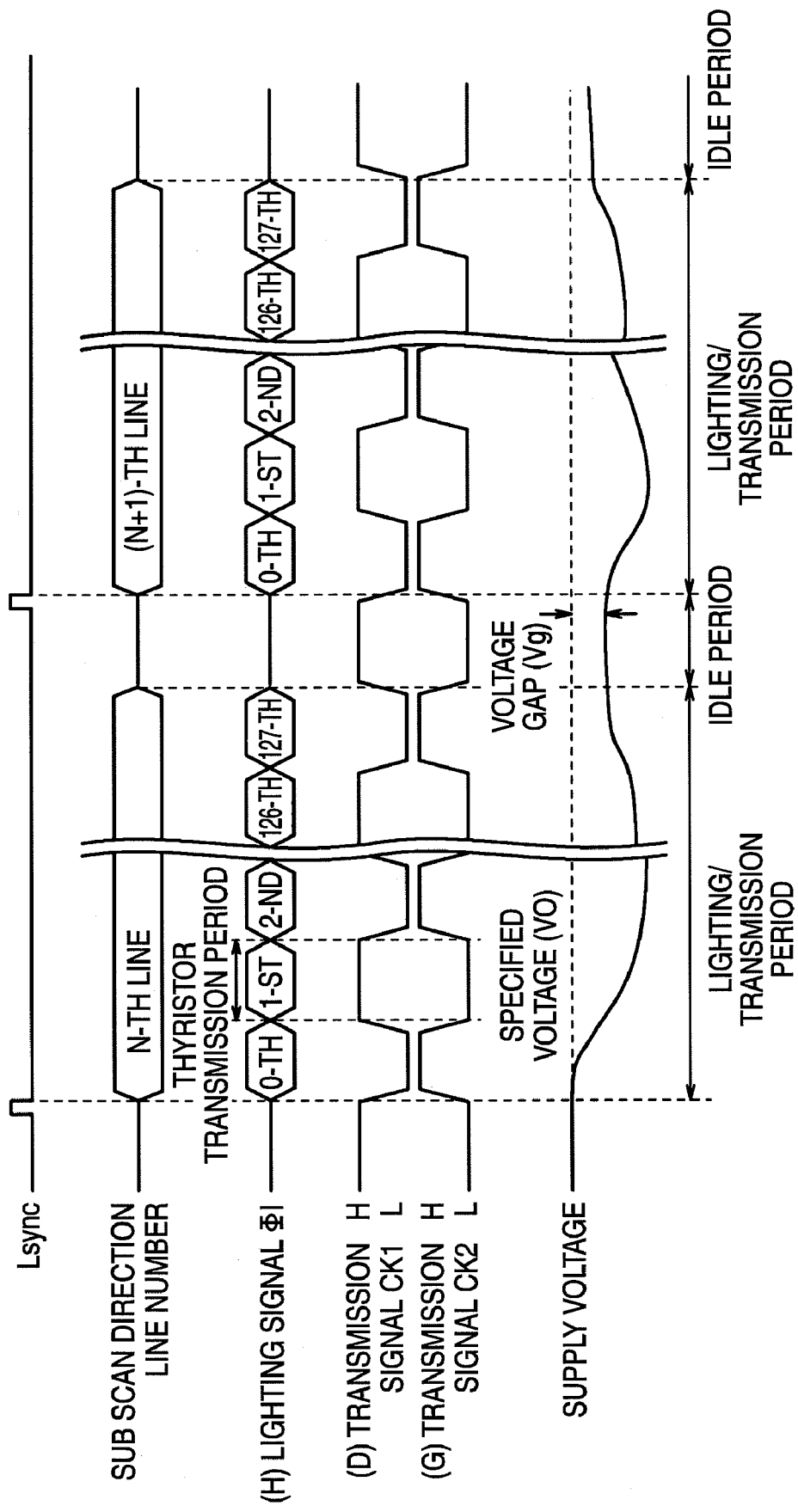
FIG. 14 is a timing chart for each signal in the related art of the present invention.

FIGS. 13 and 14 are timing charts for each signal in the related art of the present invention.

These figures show timings at which the light signal ΦI, the transmission signal CK1 and the transmission signal CK2 are generated for each line in a sub scan direction and examples of changes in the voltage (supply voltage) supplied from the 3-terminal regulator 101 at that time, assuming the above-described circuit configuration of FIG. 11. FIG. 13 shows a case where process speed, which is the image forming speed of the image forming apparatus, is, for example, 150 mm/sec and FIG. 14 shows a case where the process speed is, for example, 100 mm/sec.

In the example of FIG. 14, an output period of the signal Lsync to set the output timing for each line in the sub scan direction is set to be longer than 150 mm/sec since the process speed (here, 100 mm/sec) is lower than 150 mm/sec. Accordingly, the timing signal generating unit 114 of the signal generating circuit 42 may set a period at which 128 thyristors S1, S2, . . . shown in FIG. 4 are alternately turned on/off (hereinafter referred to as "thyristor transmission period"), that is, time during which the thyristors S1, S2, . . . are turned on, to be long. In addition, a period of time until a 0-th lighting signal Φ1 at the next sub scan direction (N+1)-th line is output after a 127-th lighting signal Φ128 at the sub scan direction N-th line is output (hereinafter referred to as "idle period") may be set to be long.

On the other hand, in the example of FIG. 13, since the process speed (here, 150 mm/sec) is higher than 100 mm/sec, the output period of the signal Lsync is set to be shorter than 100 mm/sec. Accordingly, the timing signal generating unit 114 of the signal generating circuit 42 may set the thyristor transmission period to be shorter than the process speed of 100 mm/sec. In addition, the idle period is also set to be shorter than the process speed of 100 mm/sec.

However, although the 3-terminal regulator 101 attempts to output the preset voltage VDD (3.3 V in this exemplary embodiment) to the LED array 23, the voltage to be actually supplied to the LED array 23 may be lower than the specified voltage V0, which is defined by the predetermined voltage VDD (3.3 V) by the 3-terminal regulator 101, due to the current consumed by the lighting of the LEDs in the LED array 23, during a period of time for which the LED array 23 is lit (hereinafter referred to as "lighting/transmission period"), although there is more or less difference due to a difference in the lighting rate in the LED chips 40.

The supply voltage lowered during the lighting/transmission period is slowly recovered during the idle period to approach the specified voltage V0, but is different in its recovery level depending on the length of the idle period. For example, in the case of the process speed of 100 mm/sec shown in FIG. 13, since the idle period is relatively long, the amount of recovery is large and the voltage gap Vg (Vg=V0−supply voltage) between the specified voltage V0 and the supply voltage is relatively small. On the other hand, in the case of the process speed of 150 mm/sec shown in FIG. 14, since the idle period is shorter than the process speed of 100 mm/sec, the amount of recovery is small and the voltage gap Vg is relatively large.

In this manner, if the image forming apparatus is configured to be operated by selecting one of plural different process speeds, for example, when image formation is moved from the sub scan direction N-th line to the next sub scan direction (N+1)-th line, the supply voltage of the LED array 23 is varied depending on the length of the idle period.

As described above, the concentration unevenness correction data for correcting variations of the amount of light emitted from the LEDs in the LED array 23 are stored in the concentration unevenness correction data unit 112 of the signal generating circuit 42, and the concentration unevenness correction data are output to the lighting time control/driving unit 118-1 to 118-58. Accordingly, the variations of the amount of light emitted from the LEDs are corrected to make the image concentration uniform.

In this case, the concentration unevenness correction data are generated based on the light amount correction data of LEDs calculated in advance when the LED array 23 is manufactured, and if necessary, light amount correction data and other data.

However, the light amount correction data of LEDs are data generated on the assumption that the same voltage is supplied to the LED array 23. Accordingly, as described above, in the case where different process speeds are set, if the supply voltages to the LED array 23 are different depending on the length of the idle period, it is difficult to properly correct variations in the amount of light emitted from the LEDs.

Therefore, even if process speeds are different, this exemplary embodiment is configured to change the thyristor transmission period for each process speed so that the idle period can be substantially constant at the different process speeds.

That is, in the signal generating circuit 42 of this exemplary embodiment, the thyristor transmission period for each process speed is changed such that the length of the idle period when other process speeds (for example, 100 mm/sec) are set is adjusted to the length of the idle period when the highest process speed (for example, 150 mm/sec) of plural settable process speeds is set.

Thyristor transmission period setting data to set the thyristor transmission period for each process speed are stored in advance in the EEPROM 102, and the controller 130 reads it and transmits the read thyristor transmission period setting data to the timing signal generating unit 114. Then, the timing signal generating unit 114 changes the timing at which the potential of the transmission signals CK1 and CK2 is set from "H" to "L" or from "L" to "H" using the transmission signals CK1R, CK1C, CK2R and CK2C according to the thyristor transmission period setting data. Accordingly, the thyristor transmission period is determined such that the idle period for each process speed is substantially made constant.

In this case, it is considered that the thyristor transmission period for each thyristor S1, S2, ... is increased by a uniform predetermined time (for example, the thyristor transmission period for each thyristor S1, S2, ... is uniformly increased by +1).

However, if the number of LEDs included in the LED chip 40 is large, this may make it difficult to adjust the idle period for each process speed to a nearly constant time since the lighting/transmission period becomes significantly long and accordingly the idle period becomes significantly short. For example, if the number of LEDs included in the LED chip 40 is 256, simply by uniformly increasing the thyristor transmission period of each LED by +1, the lighting/transmission period is increased by +256 and conversely, the idle period is decreased by +256. Accordingly, for example, if the lighting/transmission period is somewhat increased by +20 and the idle period is decreased by +20, the idle period for each process speed may not be adjusted to a nearly constant time even when it is likely to be adjusted to a nearly constant time.

Therefore, the following description will be given to the configuration and operation of the apparatus of this exemplary embodiment which is capable of minutely adjusting an idle period for each process speed even if a large number of LEDs are included in the LED chip 40 and increasing a degree of freedom in the setting of the idle period. Although it has been illustrated in the above that the number of LEDs of each LED chip 40 is 128, an example where the number of LEDs of each LED chip 40 is 256 will be described below.

Figure 15:
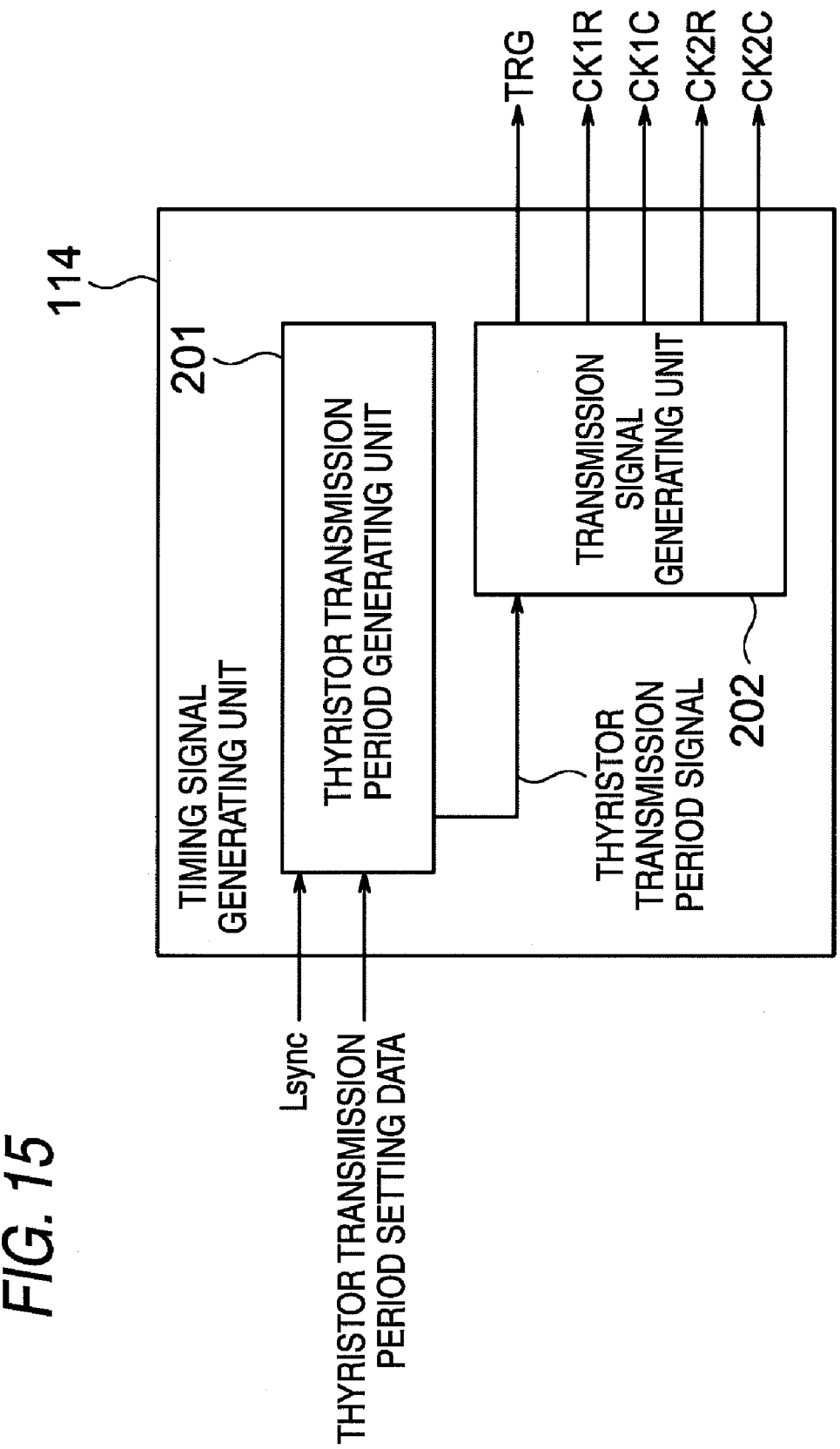
FIG. 15 is a block diagram showing a configuration of a timing signal generating unit in the image forming apparatus according to the exemplary embodiment of the present invention.

FIG. 15 is a block diagram showing a configuration of the timing signal generating unit 114 in the image forming apparatus according to this exemplary embodiment.

The timing signal generating unit 114 includes a thyristor transmission period generating unit 201 and a transmission signal generating unit 202. The thyristor transmission period generating unit 201 generates a thyristor transmission period signal based on the signal Lsync and the thyristor transmission period setting data and transmits the generated signal to the transmission signal generating unit 202. The "thyristor transmission period signal" is a signal to determine the rising or falling timing of the transmission signals CK1C and CK2C. The transmission signal generating unit 202 generates the transmission signals CK1R, CK1C, CK2R and CK2C based on the thyristor transmission period signal. The trigger signal TRG is also generated.

Figure 16:
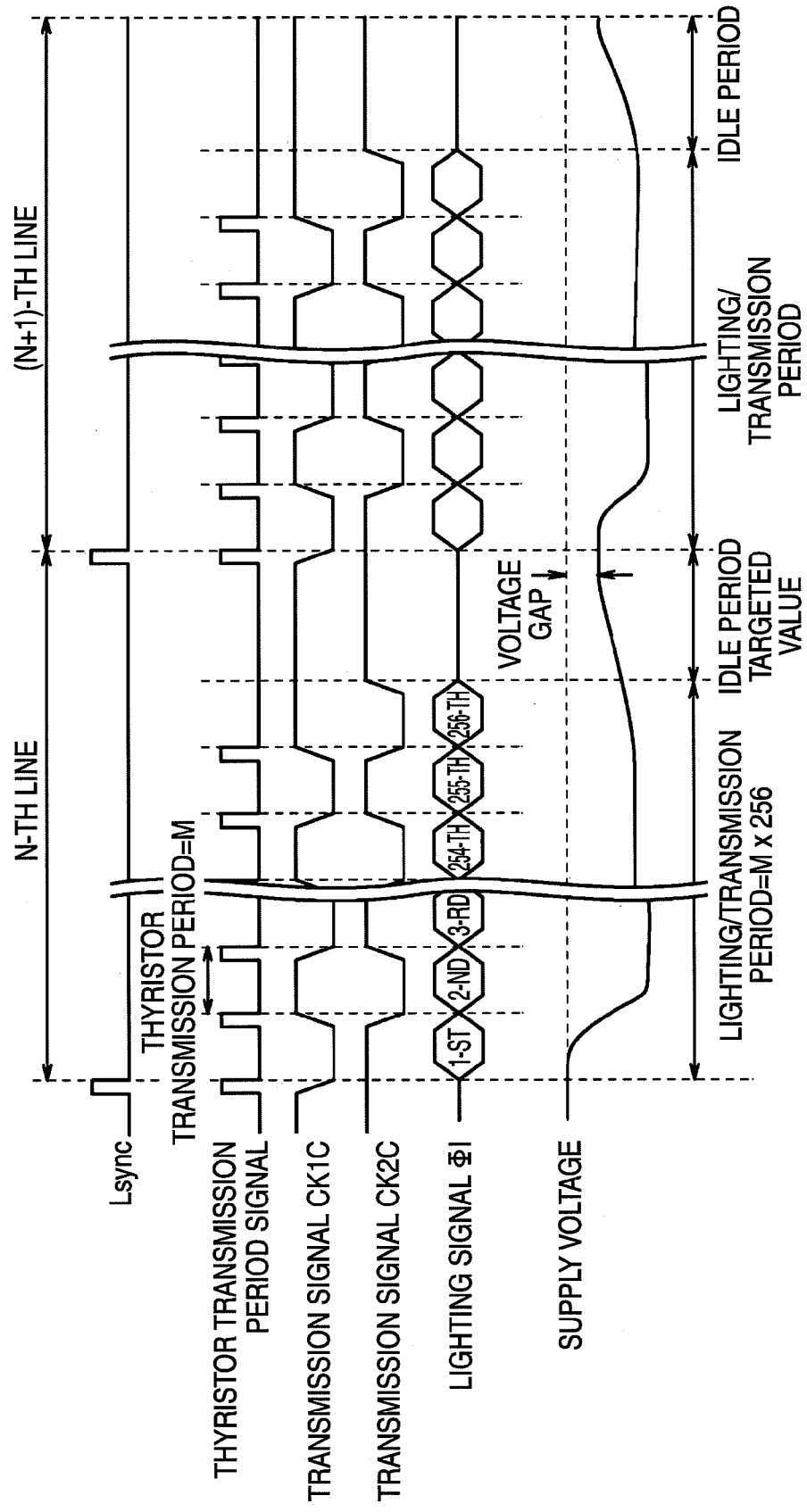
FIG. 16 is a timing chart for each signal of the timing signal generating unit in the image forming apparatus according to the exemplary embodiment of the present invention.

FIG. 16 is a timing chart for each signal of the timing signal generating unit 114 of FIG. 15.

This example assumes that the process speed is 150 mm/sec. The thyristor transmission period of each of LEDs No. 1 to 256 included in the LED chip 40 is uniformly M (M is a positive integer). Accordingly, the lighting/transmission period becomes M×256. The idle period when the process speed is 150 mm/sec and the lighting/transmission period is M×256 is assumed to be a targeted value of the idle period for each process speed.

Figure 17:
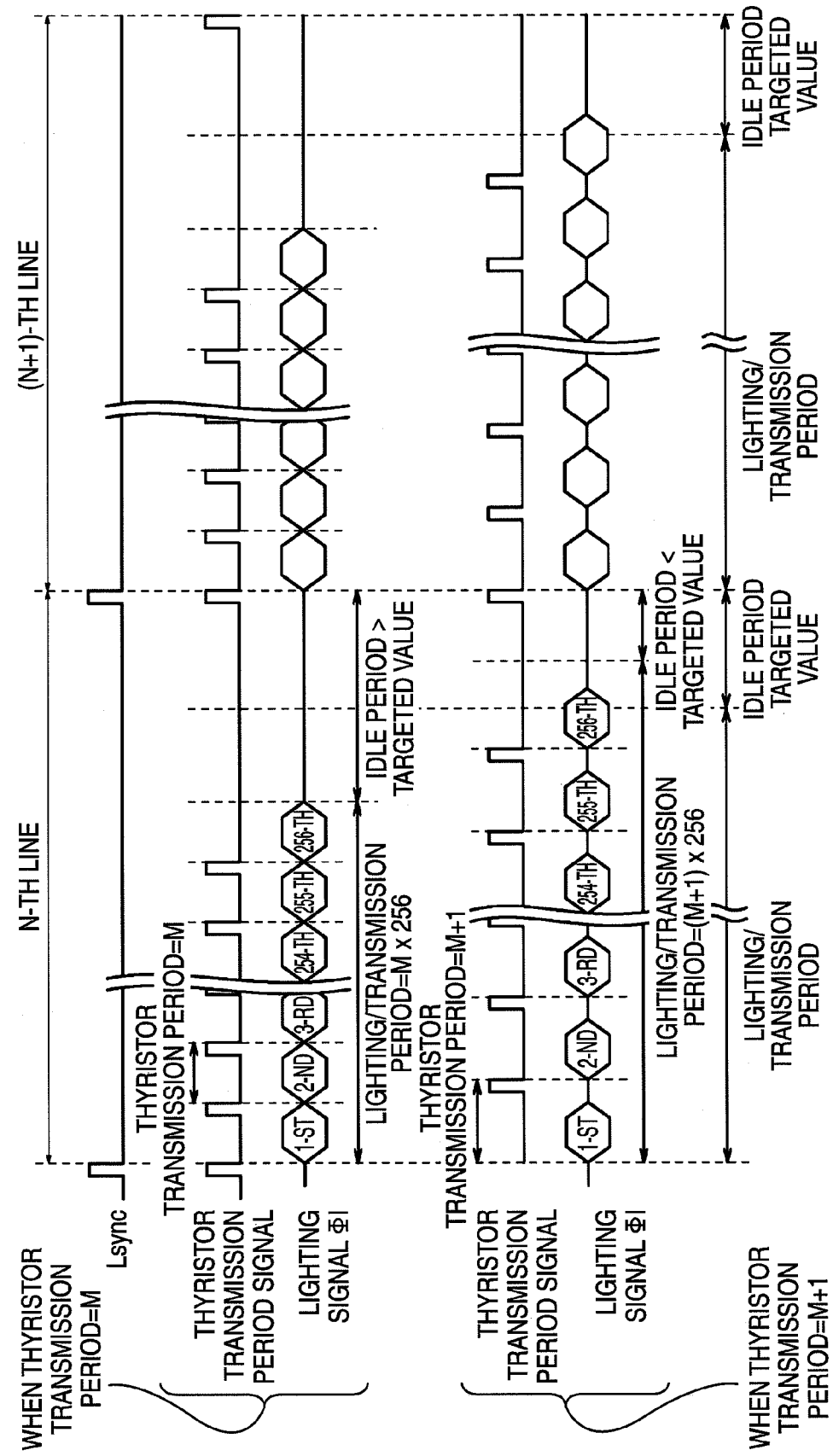
FIG. 17 is a timing chart for each signal in the related art of the present invention.

FIG. 17 is a timing chart for each signal in the related art of the present invention.

FIG. 17 shows a case where the process speed is 100 mm/sec. In the example shown in the upper side of FIG. 17, the thyristor transmission period of LEDs No. 1 to 256 is assumed to be uniformly M. In this example, the idle period becomes longer than the targeted value of the idle period shown in FIG. 16.

In addition, in the example shown in the lower side of FIG. 17, the thyristor transmission period of LEDs No. 1 to 256 is assumed to be uniformly M+1. In this example, the idle period becomes shorter than the targeted value of the idle period shown in FIG. 16.

The example of the upper side of FIG. 17 shows that "main scan period=(exposure/transmission time)+(idle period)=

(N×reference clock×M)+(reference clock×R)." Where, N is the number of LEDs, M is the thyristor transmission period, and R is the idle period (N, M and R all are positive integers).

On the contrary, in this exemplary embodiment, the thyristor transmission period is changed to M+1 by increasing the reference thyristor transmission period M by +1 for some of 256 thyristor transmission periods during the lighting/transmission period of one line, and the reference thyristor transmission period M remains unchanged for the remaining thyristor transmission periods.

That is, the relationship of "main scan period=(exposure/transmission time)+(idle period)=(N×reference clock×M+F)+(reference clock×R)" is established. Where, F is the number of the M+1 thyristor transmission period and $0 \leqq F < N$ (F is a positive integer). Accordingly, without the idle period being significantly shortened (decreased by +256) with the thyristor transmission period of each LED uniformly set as M+1 like the example shown in the lower side of FIG. 17, the idle period can be adjusted to become short by a predetermined value shorter than +256.

Figure 18:
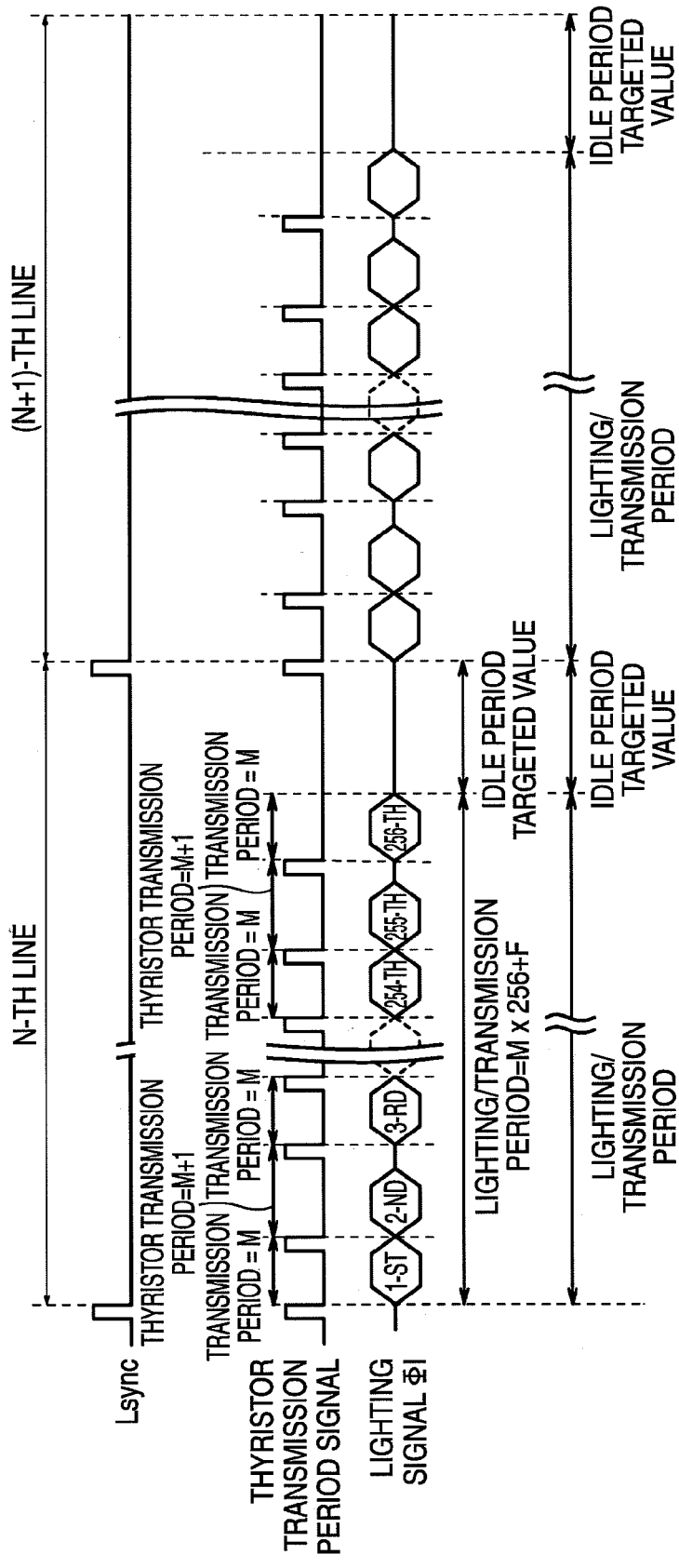
FIG. 18 is a timing chart for each signal in the image forming apparatus according to the exemplary embodiment of the present invention.

FIG. 18 is a timing chart of each signal in this exemplary embodiment of this case.

FIG. 18 shows an example where the process speed is 100 mm/sec. In this example, instead of setting the thyristor transmission period of LEDs No. 1 to 256 to be uniformly M+1 like the example of the lower side of FIG. 17, the thyristor transmission period is changed to M+1 by increasing the reference thyristor transmission period M by +1 for some of the 256 thyristor transmission periods during the lighting/transmission period of one line, and the reference thyristor transmission period M remains unchanged for the remaining thyristor transmission periods. That is, in the example of FIG. 18, the thyristor transmission periods of LEDs Nos. 2, 255 and so on are set to be M+1 and the remaining thyristor transmission periods remain unchanged as M. Accordingly, the idle period becomes substantially equal to the targeted value of the case where the process speed is 150 mm/sec (FIG. 16). In addition, even when the thyristor transmission period is changed from M to M+1, the emission time of LEDs is invariable since the lighting signal ΦI is constant independent of whether the thyristor transmission period is M or M+1.

In this case, although it may be configured that the thyristor transmission period set as M+1 continuously appears during one lighting/transmission period, it is preferable that one or more thyristor transmission periods set as M are placed between two thyristor transmission periods set as M+1 as in the example of FIG. 17.

In addition, although an M+1 thyristor transmission period may be assumed to be a thyristor transmission period at the same position during the lighting/transmission period of each main scan line, it is preferable that M+1 thyristor transmission periods for each main scan line are set to be different.

Figure 19:
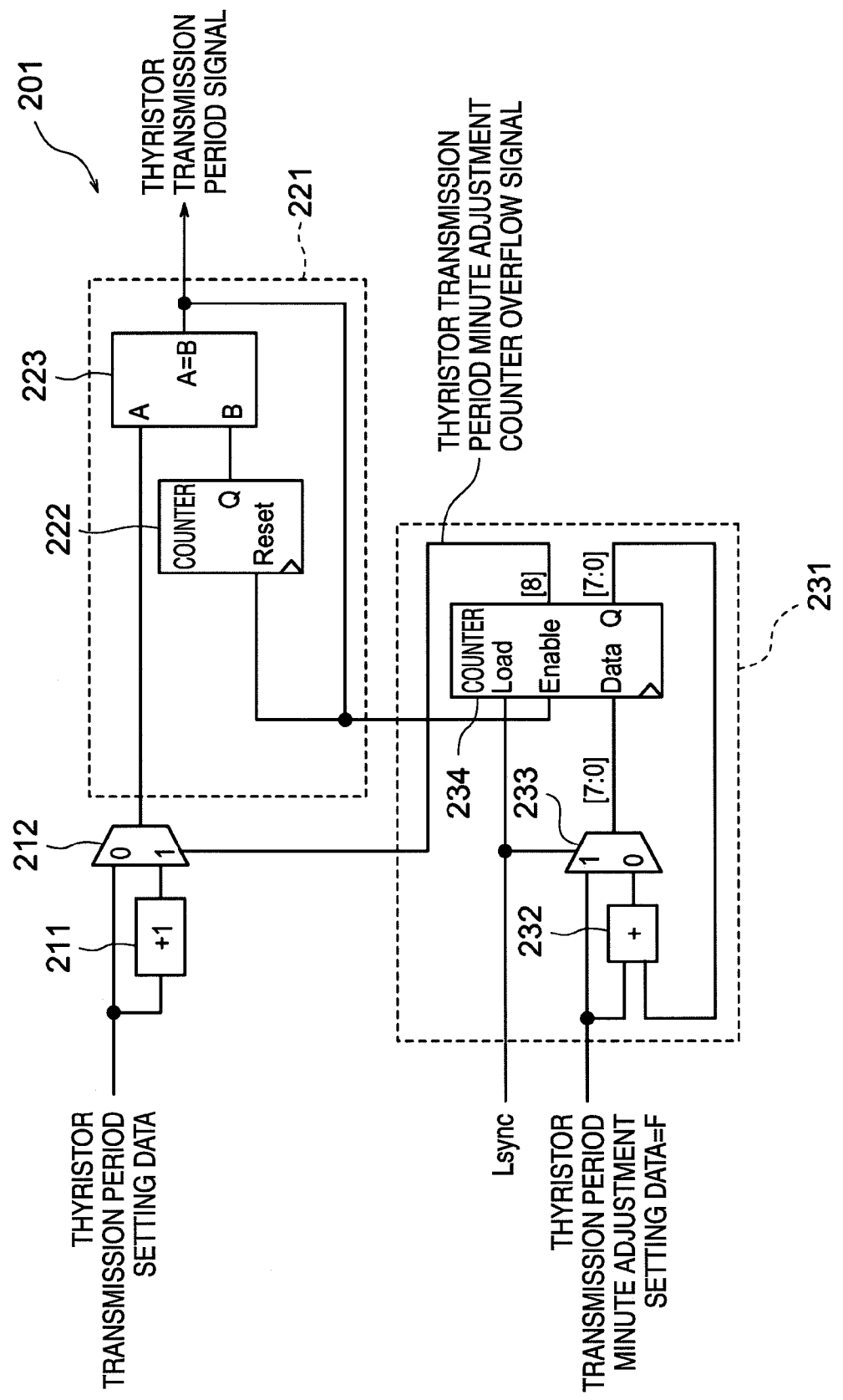
FIG. 19 is a circuit diagram showing an example of a configuration of a transmission period generating unit in the image forming apparatus according to the exemplary embodiment of the present invention.

FIG. 19 is a circuit diagram showing an example of a configuration of the transmission period generating unit 201 to enable the operation of FIG. 18.

As described above, the transmission period generating unit 201 receives the thyristor transmission period setting data. The thyristor transmission period setting data is output from the controller 130 and is used to set the reference thyristor transmission period M. An adding unit 211 generates a thyristor transmission period M+1 by adding +1 to the thyristor transmission period M. A selective transmitting unit 212 transmits one selected from the reference thyristor transmission period M and the thyristor transmission period M+1 generated by the addition of +1 in the adding unit 211 to a thyristor transmission period counter 221.

The thyristor transmission period counter 221 includes a counter 222 and a comparator 223. The counter 222 counts numbers in order from one. A period during which this counter number is counted from 1 to M corresponds to the thyristor transmission period M. The comparator 223 compares the count value of the counter 222 with the thyristor transmission period M or M+1 output by the selective transmitting unit 212 and transmits a thyristor transmission period signal to the transmission signal generating unit 202 when both become equal to each other. The thyristor transmission period signal determines the timing of the termination of one thyristor transmission period, and timings of the thyristor transmission period signal are different from each other depending on which of M or M+1 the selective transmitting unit 212 outputs as the thyristor transmission period. That is, the thyristor transmission period signal is transmitted to set the thyristor transmission period to be M or M+1. The counter 222 is reset by the thyristor transmission period signal.

A thyristor transmission period minute adjustment counter 231 includes an adding unit 232, a selective transmitting unit 233 and a counter 234. Thyristor transmission period minute adjustment setting data is transmitted from the controller 130 to the adding unit 232 and the selective transmitting unit 233. The thyristor transmission period minute adjustment setting data is data to set the number of M+1 thyristor transmission periods during one main scan line and corresponds to a value of F as described above. The adding unit 232 adds a count value of the counter 234 to the thyristor transmission period minute adjustment setting data. The selective transmitting unit 233 transmits the thyristor transmission period minute adjustment setting data F or a result of the addition in the adding unit 232 to the counter 234. That is, when the signal Lsync is transmitted, the thyristor transmission period minute adjustment setting data F is transmitted to the counter 234, and thereafter, the addition result in the adding unit 232 is transmitted to the counter 234.

The counter 234 counts a value transmitted by the selective transmitting unit 233 for each thyristor transmission period signal during one main scan line and transmits the counted value to the adding unit 232. Accordingly, the values of the thyristor transmission period minute adjustment setting data F are successively added for each thyristor transmission period signal. For example, if the value of the thyristor transmission period minute adjustment setting data F is 8, the value of the counter 234 is increased to 8, 16, 24, . . . for each thyristor transmission period signal. If the value increased for each thyristor transmission period signal overflows the number (256) of lighted LEDs during one main scan, the counter 234 transmits a counter overflow signal for thyristor transmission period minute adjustment to the selective transmitting unit 212 during a period of one thyristor transmission period signal, while the selective transmitting unit 212 transmits a value of M+1 as a thyristor transmission period to the comparator 223. In this manner, whenever the value of the counter 234 increasing to 8, 16, 24, . . . overflows the number (256) of lighted LEDs during one main scan period (first, 256, after that, 512, 768, 1024, . . . as a multiple of 256), the thyristor transmission period is changed from the reference M to M+1, and thyristor transmission periods of the same number as the thyristor transmission period minute adjustment setting data F become M+1 during one main scan period. In addition, thyristor transmission periods M of the same number are placed between thyristor transmission periods M+1 each time.

In this case, since the thyristor transmission period minute adjustment counter 231 is reset by the signal Lsync, positions at which the thyristor transmission period becomes M+1 in every main scan period become equal.

Figure 20:
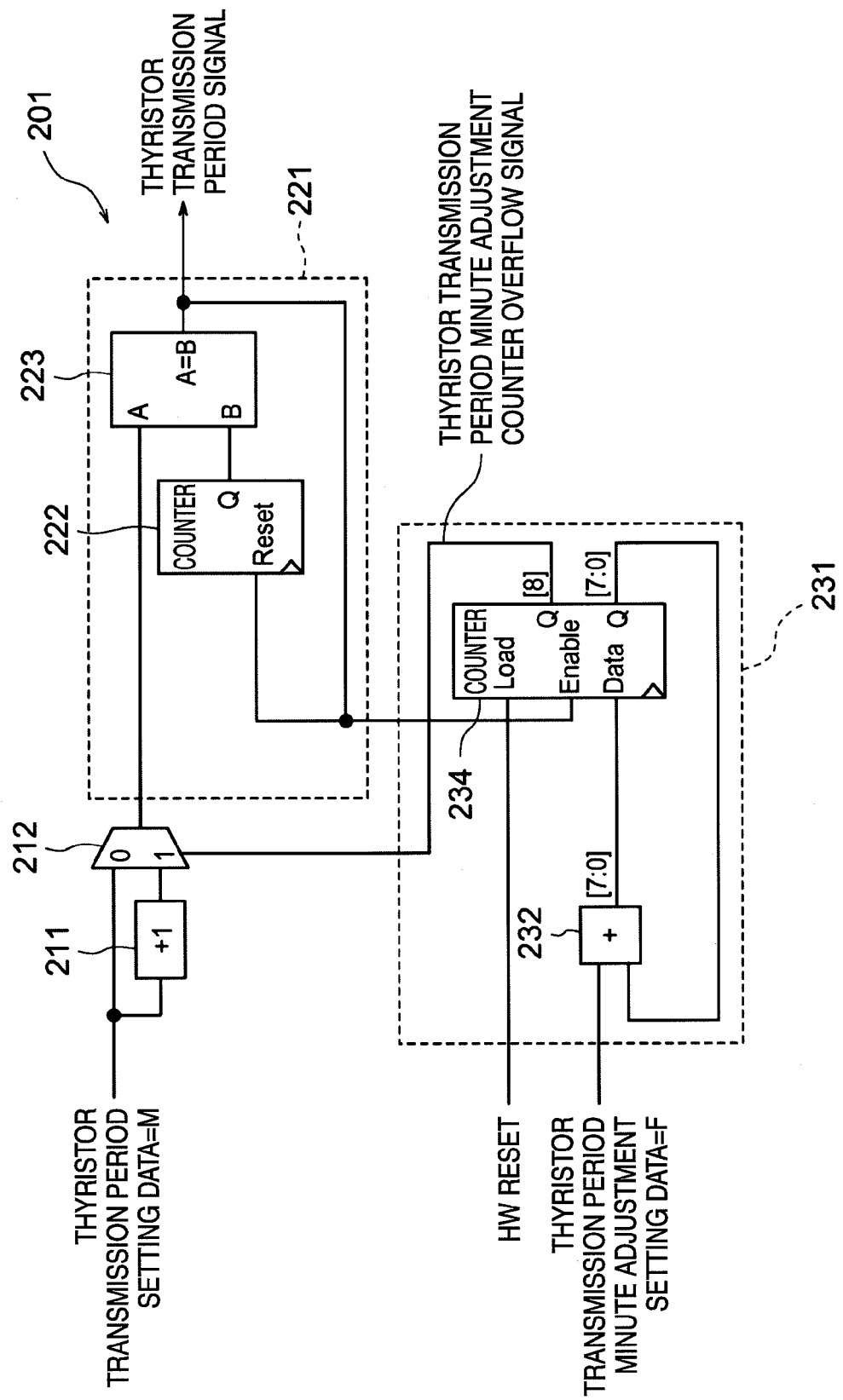
FIG. 20 is a circuit diagram showing another example of the configuration of the transmission period generating unit in the image forming apparatus according to the exemplary embodiment of the present invention.

FIG. 20 is a circuit diagram showing another example of the configuration of the transmission period generating unit 201 to enable the operation of FIG. 18.

In FIG. 20, circuit elements denoted by the same reference numerals as FIG. 19 are the same as those shown in FIG. 19, and therefore, detailed explanation of these will not be repeated.

In the example of the circuit configuration of FIG. 20, the thyristor transmission period minute adjustment counter 231 is reset by an HW reset signal output from the controller 130 whenever one image is completely formed, instead of being reset by the signal Lsync.

Accordingly, the example of the circuit configuration of FIG. 20 is different from that of FIG. 19, and, in the example of FIG. 20, positions at which the thyristor transmission period becomes M+1 in every main scan line may be different.

Figure 21:
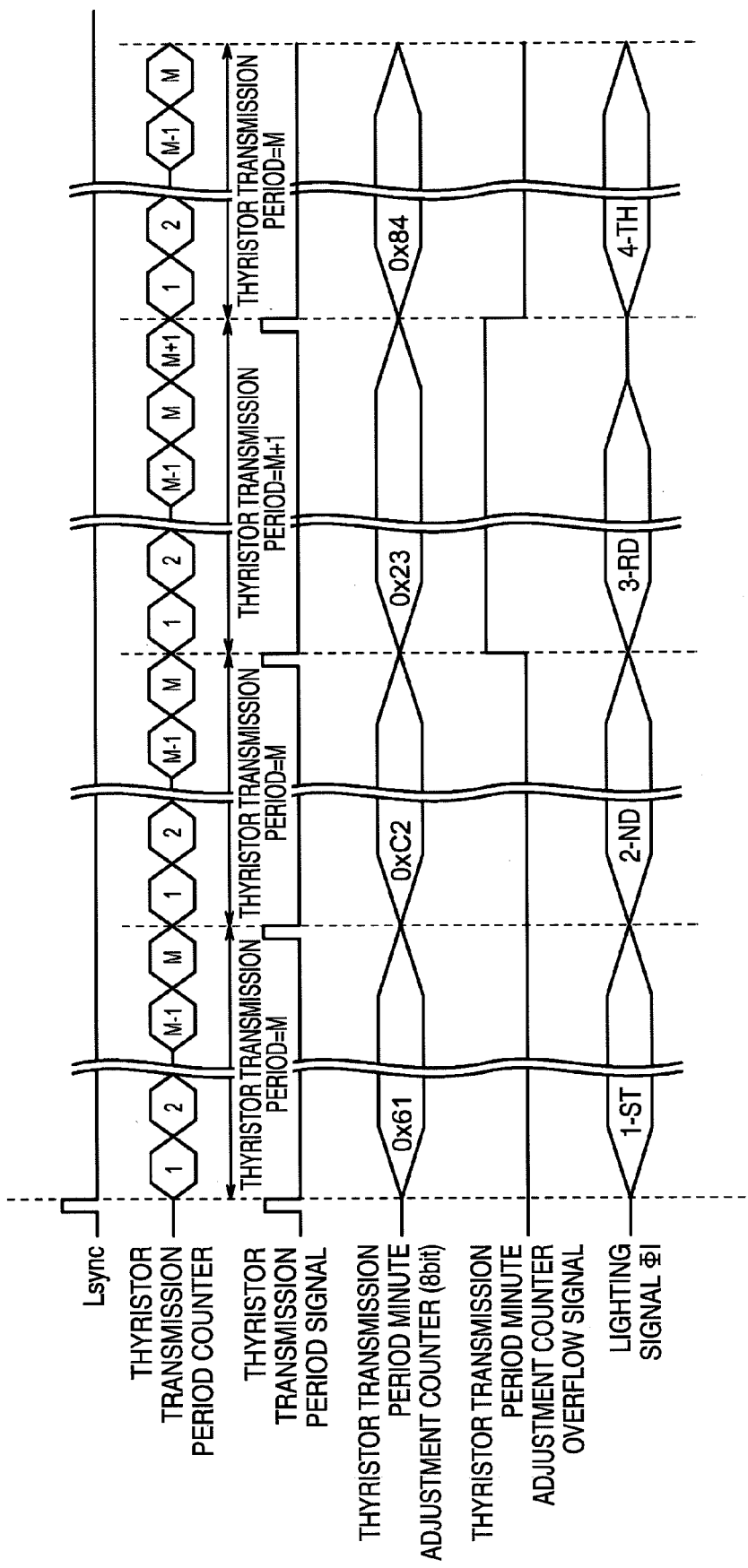
FIG. 21 is a timing chart for each signal in the image forming apparatus according to the exemplary embodiment of the present invention.

FIG. 21 is a timing chart for each signal in the examples of FIGS. 19 and 20.

In this example, a third thyristor transmission period in one main scan line is changed to M+1 with the remaining thyristor transmission periods maintained as the reference M.

What is claimed is:

1. An exposure device comprising:
a plurality of light emitting elements that light in turn for exposure;
a plurality of driving elements that drive each of the light emitting elements; and
a time changing member that changes one time period of a switching signal to switch light emitting elements driven by the driving elements among the plurality of light emitting elements in turn from a reference time, depending on an image forming speed, such that an idle period between lighting/transmission periods of the plurality of light emitting elements is substantially the same at respective image forming speeds,
wherein the time changing member changes the one time period from the reference time for some of the light emitting elements during one main scan, and maintains the one time period as the reference time for the remaining light emitting elements.

2. The exposure device according to claim 1,
wherein, if there are a plurality of light emitting elements to change the one time period from the reference time during one main scan, the time changing member places the light emitting elements to maintain the one time period as the reference time between the plurality of light emitting elements.

3. The exposure device according to claim 1,
wherein the time changing member changes the light emitting elements to change the one time period from the reference time during one main scan every main scan line.

4. The exposure device according to claim 1,
wherein the time changing member maintains the one time period from the reference time when the image forming speed is at a given speed, and
wherein if the image forming speed is slower than the given speed, then the time changing member lengthens the one time period from the reference time for some of the light emitting elements during one main scan and maintains the one time period as the reference time for remaining light emitting elements, in order to keep the idle period at a target value.

5. An image forming apparatus comprising:
a photoconductor;
an exposure device that forms a latent image on the photoconductor; and
a developing unit that develops the latent image,
wherein the exposure device includes:
a plurality of light emitting elements that light in turn for exposure;
a plurality of driving elements that drive each of the light emitting elements; and
a time changing member that changes one time period of a switching signal to switch light emitting elements driven by the driving elements among the plurality of light emitting elements in turn from a reference time, depending on an image forming speed, such that an idle period between lighting/transmission periods of the plurality of light emitting elements is substantially the same at respective image forming speeds, and
wherein the time changing member changes the one time period from the reference time for some of the light emitting elements during one main scan, and maintains the one time period as the reference time for the remaining light emitting elements.

6. A computer readable medium storing a program causing a computer to execute a process for exposure control of an exposure device, the process comprising:
controlling the exposure device including:
a plurality of light emitting elements that light in turn for exposure;
a plurality of driving elements that drive each of the light emitting elements; and
a time changing member that changes one time period of a switching signal to switch light emitting elements driven by the driving elements among the plurality of light emitting elements in turn from a reference time, depending on an image forming speed, such that an idle period between lighting/transmission periods of the plurality of light emitting elements is substantially the same at respective image forming speeds, and
changing the one time period from the reference time for some of the light emitting elements during one main scan by the time changing member with maintaining the one time period as the reference time for the remaining light emitting elements.

* * * * *